(12) United States Patent
Tian et al.

(10) Patent No.: US 11,671,030 B2
(45) Date of Patent: Jun. 6, 2023

(54) INTERLEAVED CONVERTER

(71) Applicant: ABB Schweiz AG, Baden (CH)

(72) Inventors: Kai Tian, Hebei (CN); Tinho Li, Hong Kong (CN); Kuenfaat Yuen, Hong Kong (CN); Mei Liang, Beijing (CN)

(73) Assignee: ABB Schweiz AG, Baden (CH)

( * ) Notice: Subject to any disclaimer, the term of this patent is extended or adjusted under 35 U.S.C. 154(b) by 84 days.

(21) Appl. No.: 17/423,584

(22) PCT Filed: Jun. 12, 2019

(86) PCT No.: PCT/CN2019/090939
§ 371 (c)(1),
(2) Date: Jul. 16, 2021

(87) PCT Pub. No.: WO2020/248168
PCT Pub. Date: Dec. 17, 2020

(65) Prior Publication Data
US 2022/0103085 A1 Mar. 31, 2022

(51) Int. Cl.
*H02M 7/23* (2006.01)
*H02M 5/293* (2006.01)
*H02M 1/00* (2006.01)

(52) U.S. Cl.
CPC .......... *H02M 7/23* (2013.01); *H02M 1/0064* (2021.05); *H02M 5/293* (2013.01); *H02M 1/0043* (2021.05)

(58) Field of Classification Search
CPC ...... H02M 7/23; H02M 1/0064; H02M 5/293; H02M 1/0043
See application file for complete search history.

(56) References Cited

U.S. PATENT DOCUMENTS

| 10,312,810 B1 | 6/2019 | Ge et al. |
| 2012/0032651 A1 | 2/2012 | Torrico-Bascopé |
| 2016/0358705 A1 | 12/2016 | Lin et al. |

FOREIGN PATENT DOCUMENTS

| AT | 401591 B | * 8/1996 | ............. H02M 7/23 |
| CN | 101917008 A | 12/2010 | |

(Continued)

OTHER PUBLICATIONS

Chinese National Intellectual Property Administration, International Search Report in International Patent Application No. PCT/CN2019/090939, 4 pp. (dated Mar. 13, 2020).

(Continued)

*Primary Examiner* — Gary L Laxton
(74) *Attorney, Agent, or Firm* — Leydig, Voit & Mayer, Ltd.

(57) ABSTRACT

Voltage converter circuits including a first and second branch. The first branch is coupled between a first DC terminal and a second DC terminal and includes a first and second winding around a magnetic core. The first and second winding are coupled to an AC terminal via a common node. The second branch is coupled in parallel to the first branch between the first and second DC terminals and includes a third winding around the magnetic core. The third winding is coupled to the AC terminal such that the first and second branches convert a first voltage into a second voltage. The first, second and third windings are configured to cause magnetic flux generated by a differential mode (DM) component of a first current in the first branch and magnetic flux generated by the DM component of a second current in the second branch to enhance with each other.

20 Claims, 17 Drawing Sheets

(56) References Cited

FOREIGN PATENT DOCUMENTS

CN  104167902 A  11/2014
CN  106531401 A   3/2017

OTHER PUBLICATIONS

Chinese National Intellectual Property Administration, Written Opinion in International Patent Application No. PCT/CN2019/090939, 4 pp. (dated Mar. 13, 2020).
Joca et al., "A single-phase isolated AC-DC converter using an interleaved MMC," *2015 IEEE 13th Brazilian Power Electronics Conference and 1st Southern Power Electronics Conference (COBEP/SPEC), IEEE*, 6 pp. (Nov. 29-Dec. 2, 2015).
Pou et al., "Control Strategy to Balance Operation of Parallel Connected Legs of Modular Multilevel Converters," *2013 IEEE International Symposium on Industrial Electronics (ISIE), IEEE*, 7 pp. (May 28-31, 2013).
European Patent Office, Extended European Search Report in European Patent Application No. 19932794.1, 11 pp. (dated Nov. 22, 2022).

\* cited by examiner

US 11,671,030 B2

INTERLEAVED CONVERTER

CROSS-REFERENCE TO RELATED APPLICATIONS

This patent application is a U.S. national phase patent application of International Patent Application No. PCT/CN2019/090939, filed Jun. 12, 2019, which is fully incorporated herein by reference for all purposes.

TECHNICAL FIELD

Example embodiments of the present disclosure generally relate to an electrical apparatus and more particularly, to a voltage converter circuit and an apparatus including the voltage converter circuit.

BACKGROUND

Interleaving is a promising and verified technology to implement low cost and high efficiency power converters. Interleaved converters of various topologies have been applied in electric vehicle (EV) charger, uninterruptible power system (UPS), solar or wind energy converters.

In a power module of the EV charger, for example, the first stage is power factor correction (PFC) converting an alternating current (AC) voltage from the AC grid to a stable direct current (DC) bus voltage for feeding a following DC-DC converter. Among various interleaved converters, interleaved Vienna topology and its variations are widely employed.

U.S. Pat. No. 8,395,913B2 describes such an approach of Vienna topology. However, these kinds of topologies usually require disposing additional components such as autotransformers outside the interleaved branches, and its application may be thus limited.

SUMMARY

Example embodiments of the present disclosure propose a solution of an interleaved voltage converter.

In a first aspect, it is provided a voltage converter circuit comprising a first branch and a second branch. The first branch is coupled between a first DC terminal and a second DC terminal and includes a first winding and a second winding around a magnetic core. The first winding and the second winding are coupled to an AC terminal via a common node. The second branch is coupled in parallel to the first branch between the first and second DC terminals and includes a third winding around the magnetic core. The third winding is coupled to the AC terminal such that the first and second branches are configured to convert a first voltage into a second voltage. The first, second and third windings are configured to cause magnetic flux generated by differential mode (DM) component of a first current in the first branch and magnetic flux generated by DM component of a second current in the second branch to enhance with each other.

In a second aspect, it is provided an electrical system. The electrical system comprises a voltage converter circuit of the first aspect and a controlling center. The controlling center is configured to receive a request for voltage conversion; and control the voltage converter circuit to provide a converted voltage based on the request.

In a third aspect, it is provided a method for manufacturing a voltage converter circuit. The method comprises providing a first branch coupled between a DC terminal and a second DC terminal and including a first winding and a second winding around a magnetic core. The first winding and the second winding are coupled to an alternating current terminal via a common node. The method further comprises providing a second branch coupled in parallel to the first branch between the first and second DC terminals and including a third winding around the magnetic core. The third winding is coupled to the AC terminal such that the first and second branches are configured to convert a first voltage into a second voltage. The method further comprises configuring the first, second and third windings to cause magnetic flux generated by DM component of a first current in the first branch and magnetic flux generated by DM component of a second current in the second branch to enhance with each other.

According to the embodiments of the present disclosure, the converter according to embodiments of the present disclosure may achieve a desirable efficiency based on the proposed topology.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
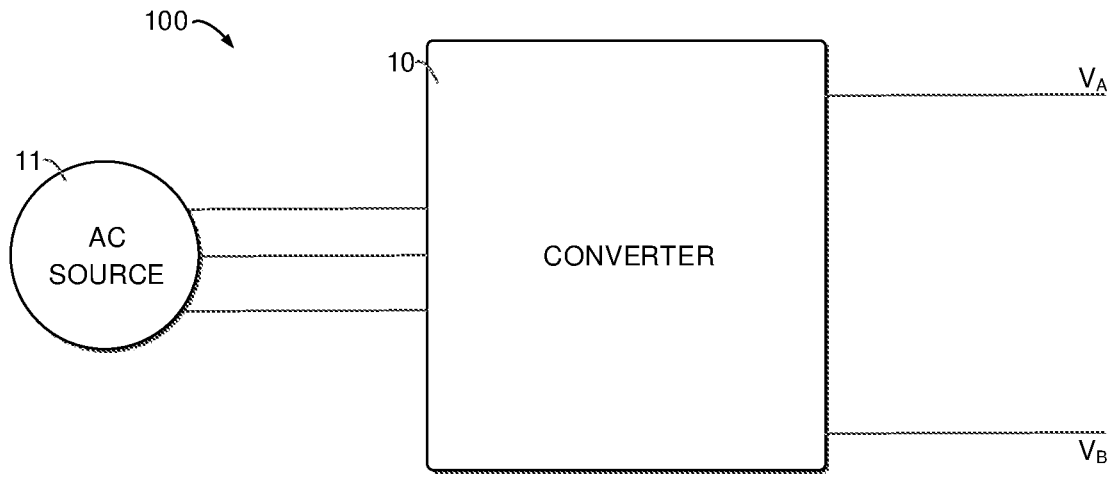
FIG. 1 illustrates an AC-DC electric system in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

Unless specified or limited otherwise, the terms "resistor", "capacitor", "inductor", "switch" and other electrical elements may include one or more element that has the same function and operates together to achieve the function. For example, a resistor may refer to two or more resistors connected in serial or in parallel to function as one resistor.

As mentioned above, conventional topologies usually require disposing additional components such as autotransformers outside the interleaved branches, and the application may be thus limited.

FIG. 1 illustrates an AC-DC electric system 100 in accordance with some example embodiments of the present disclosure. The electric system 100 includes an AC source 11, and a converter 10 for converting an AC current into a DC current. Although the AC-DC electric system 100 is illustrated, this is only for illustration without suggesting any limitations as to the scope of the subject matter described here. For example, embodiments of the disclosure may include a DC-AC electric system, as described below with reference to FIGS. 29-30.

Figure 2:
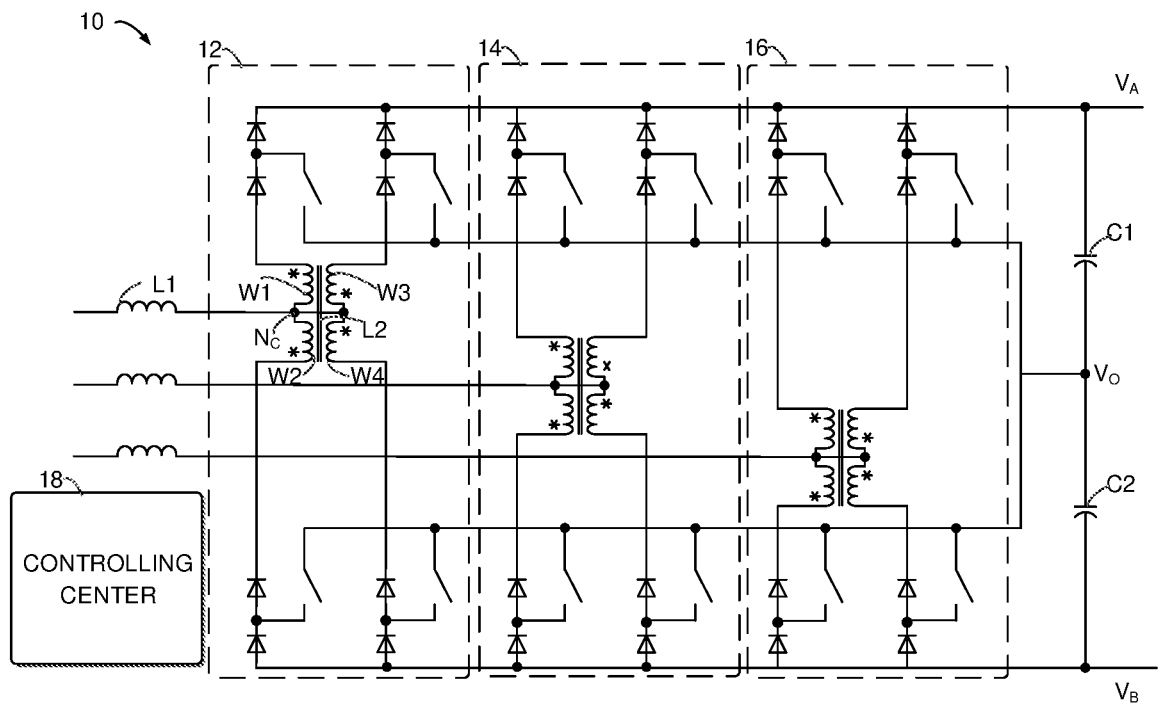
FIG. 2 illustrates an example of converter in accordance with some example embodiments of the present disclosure.

FIG. 2 illustrates an example of converter 10 in accordance with some example embodiments of the present disclosure. The converter 10 is a five-level converter, and is configured to convert an AC voltage into a DC voltage between the first and second DC terminals $V_A$ and $V_B$. Although a five-level converter 10 is illustrated, this is only for illustration without suggesting any limitations as to the scope of the subject matter described here. For example, embodiments of the disclosure may include a DC-AC electric system, as described below with reference to FIG. 28.

The converter 10 includes a first phase circuit 12, a second phase circuit 14 and a third phase circuit 16. Each phase circuit is configured to convert an AC current from a phase circuit of the AC source 11 into a DC current. For example, the first phase circuit 12 is coupled to the AC source 11 via an inductor L1, and configured to convert an AC current from a phase circuit of the AC source 11 into a DC current such that a DC voltage may be provided across the DC terminals $V_A$ and $V_B$. The inductor L1 is the AC side boost inductor.

The first phase circuit 12, the second phase circuit 14 and the third phase circuit 16 have the same configuration in FIG. 2. Thus, only the first phase circuit 12 will be described below for brevity, and the second phase circuit 14 and the third phase circuit 16 operate analogously. Although the first, second and third phase circuits employ the same configuration, this is only for illustration without suggesting any limitations as to the scope of the subject matter described here. For example, the first, second and third phase circuits employ different configurations in the variants of the present disclosure.

The converter 10 is a five-level converter in FIG. 2, and the voltage between the common node $N_C$ and the neutral node $N_O$ may present a voltage at five potential levels. The principle for the five potential levels will be described below. Although a five-level converter 10 is illustrated, this is only for illustration without suggesting any limitations as to the scope of the subject matter described here. For example, three-level or more-level, such as seven-level or nine-level, may be included in the scope of the subject matter described here.

The converter 10 includes a controlling center 18 to control operations of switches in switching circuit in the first, second and third phase circuits. The couplings of the controlling center 18 to the switches in the converter 10 are not illustrated to avoid blurring the figure. Although the couplings are not illustrated, it is understood that the controlling center 18 couples to the switches in the converter 10 directly or indirectly.

The first phase circuit 12 includes first branch and a second branch. The first branch is coupled between the first DC terminal $V_A$ and the second DC terminal $V_B$, and includes a first winding W1 and a second winding W2 around a magnetic core L2. The first winding and the second winding W1 and W2 are coupled to the AC terminal via a common node $N_C$.

The second branch is coupled in parallel to the first branch between the first and second DC terminals $V_A$ and $V_B$, and includes a third winding W3 and a fourth winding W4 around the magnetic core L2. The third winding W3 and the fourth winding W4 are coupled to the AC terminal via the common node $N_C$, such that the first and second branches are configured to convert a first voltage into a second voltage. The first, second, third and fourth windings are configured to cause magnetic flux generated by differential mode (DM) component of a first current in the first branch and magnetic flux generated by DM component of a second current in the second branch to enhance with each other.

Figure 3:
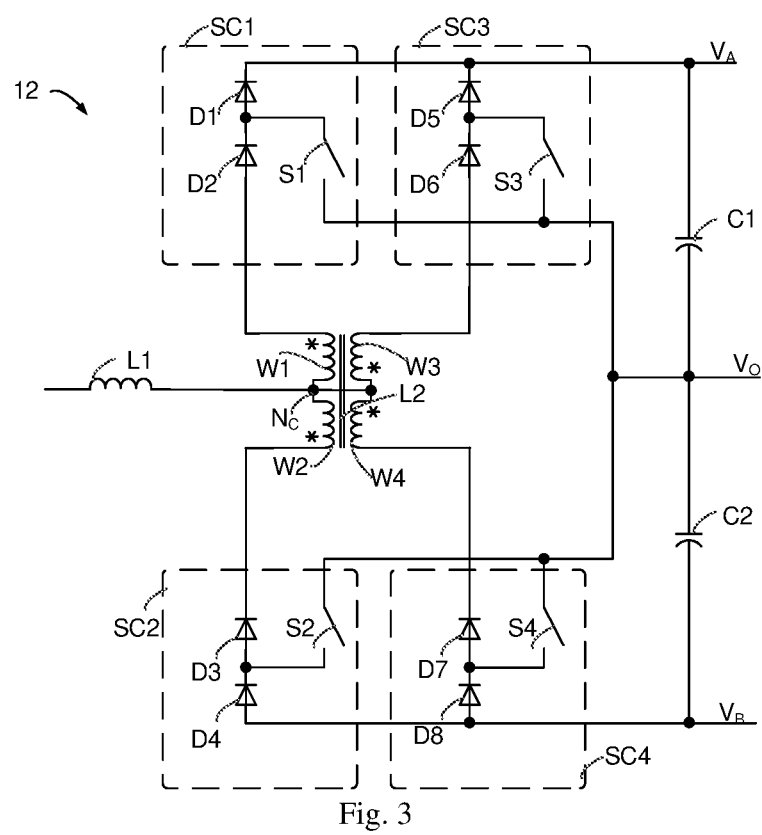
FIG. 3 illustrates an example of a phase circuit of the converter of FIG. 2 in accordance with some example embodiments of the present disclosure.

FIG. 3 illustrates an example of the first phase circuit 12 of the converter of FIG. 2 in accordance with some example embodiments of the present disclosure. The first phase circuit 12 includes the first winding W1 and the second winding W2 in the first branch and around the magnetic core L2, and the third winding W3 and the fourth winding W4 in the second branch and around the magnetic core L2.

The common node between the first and second windings W1 and W2 and the common node between the third and fourth windings W3 and W4 are coupled together sharing the reference number $N_C$. As such, the first and second branches are interleaved.

The first branch also includes a first switching circuit SC1 coupled between the first winding W1 and the first DC terminal $V_A$ and a second switching circuit SC2 between the second winding W2 and the second DC terminal $V_B$. The second branch also includes a third switching circuit SC3 coupled between the third winding W3 and the first DC terminal $V_A$ and a fourth switching circuit SC4 between the fourth winding W4 and the second DC terminal $V_B$.

The first switching circuit SC1 includes a first diode D1 and a second diode D2 coupled in series and a first switch S1 coupled to an intermediate node between the first and second diodes and the neutral node $N_O$. The second, third and fourth switching circuits SC2, SC3 and SC4 are substantially the same as the first switching circuit SC1. Thus, the description for the second, third and fourth switching circuits SC2, SC3 and SC4 are omitted here for brevity.

In an embodiment, the second, third, sixth and seventh diodes D2, D3, D6 and D7 may switch at line frequency, such as 50 or 60 Hz, and zero current crossing point. As such, the switching loss is low, which reduces operation energy loss of the system.

To sum up, a serial connection of the first winding W1 and the first switching circuit SC1 is coupled with the first DC terminal $V_A$ and the common node $N_C$. A serial connection of the third winding W3 and the third switching circuit SC3 is coupled in parallel to the serial connection of the first winding W1 and the first switching circuit S1.

A serial connection of the second winding W2 and the second switching circuit SC2 is coupled with the second DC terminal $V_B$ and the common node $N_C$. In FIG. 3, the second branch further includes a serial connection of a fourth winding W4 and a fourth switching circuit SC4. The serial connection of the fourth winding W4 and the fourth switching circuit SC4 are coupled in parallel to the serial connection of the second winding and the second switching circuit.

Assuming that the DC-link voltage across the first and second DC terminals $V_A$ and $V_B$ is $V_{AB}$, the voltage across each of the capacitors C1 and C2 is $V_{AB}/2$. As such, voltage stress on all devices is half of the DC bus voltage, and low voltage rating device may be applied to achieve a good switching performance, such as fast speed and low switching loss, and to reduce cost.

Capacitors C1 and C2 are the DC side capacitors denoting DC bus. Assuming that the potential of the neutral node $V_O$ is '0'. In this event, the phase voltage $V_P$, namely the voltage between the common node $N_C$ and the neutral node $N_O$, has five voltage levels in this topology.

The five voltage levels, corresponding to the phase voltages and device switching states are shown in Table 1.

The five voltage levels are represented by '2', '1', '0', '−1' and '−2'. Their corresponding five phase voltages are '$V_{AB}/2$', '$V_{AB}/4$', '0', '$-V_{AB}/4$' and '$-V_{AB}/2$'. In modulation, the two branches will be controlled in interleaved way, and the five voltage levels will reveal themselves automatically.

In table 1, the state of turning-on is represented by '1', and the state of turning-off is represented by '0'. For example, the symbol '1' for the first switch S1 or the first diode D1 represents that the first switch S1 or the first diode D1 is turned on, and the symbol '0' for the first switch S1 or the first diode D1 represents that the first switch S1 or the first diode D1 is turned off.

TABLE 1

Voltage level and device switching state of the converter

| Voltage Level | Phase Voltage, ($V_p$) | Device switching state (1-conduct; 0-not conduct) | | | | | | | | | | |
|---|---|---|---|---|---|---|---|---|---|---|---|---|
| | | S1 | S2 | D1 | D2 | D3 | D4 | S3 | S4 | D5 | D6 | D7 | D8 |
| 2 | $V_{AB}/2$ | 0 | 0 | 1 | 1 | 0 | 0 | 0 | 0 | 1 | 1 | 0 | 0 |
| 1 | $V_{AB}/4$ | 0 | 0 | 1 | 1 | 0 | 0 | 1 | 0 | 0 | 1 | 0 | 0 |
| | | 0 | 0 | 1 | 1 | 0 | 0 | 0 | 1 | 0 | 0 | 1 | 0 |
| | | 1 | 0 | 0 | 1 | 0 | 0 | 0 | 0 | 1 | 1 | 0 | 0 |
| | | 0 | 1 | 0 | 0 | 1 | 0 | 0 | 0 | 1 | 1 | 0 | 0 |
| 0 | 0 | 1 | 0 | 0 | 1 | 0 | 0 | 1 | 0 | 0 | 1 | 0 | 0 |
| | | 1 | 0 | 0 | 1 | 0 | 0 | 0 | 1 | 0 | 0 | 1 | 0 |
| | | 0 | 1 | 0 | 0 | 1 | 0 | 1 | 0 | 0 | 1 | 0 | 0 |
| | | 0 | 1 | 0 | 0 | 1 | 0 | 0 | 1 | 0 | 0 | 1 | 0 |
| | | 0 | 0 | 1 | 1 | 0 | 0 | 0 | 0 | 0 | 0 | 1 | 1 |
| | | 0 | 0 | 0 | 0 | 1 | 1 | 0 | 0 | 1 | 1 | 0 | 0 |
| -1 | $-V_{AB}/4$ | 0 | 0 | 0 | 0 | 1 | 1 | 1 | 0 | 0 | 1 | 0 | 0 |
| | | 0 | 0 | 0 | 0 | 1 | 1 | 0 | 1 | 0 | 0 | 1 | 0 |
| | | 1 | 0 | 0 | 1 | 0 | 0 | 0 | 0 | 0 | 0 | 1 | 1 |
| | | 0 | 1 | 0 | 0 | 1 | 0 | 0 | 0 | 0 | 0 | 1 | 1 |
| -2 | $-V_{AB}/2$ | 0 | 0 | 0 | 0 | 1 | 1 | 0 | 0 | 0 | 0 | 1 | 1 |

It is to be understood that the switching operation for the switches are controlled by the controlling center 18, and the states of the diodes are based on current direction. Assuming that the currents in the first and second branches are $i_{a1}$ and $i_{a2}$ respectively. The two currents $i_{a1}$ and $i_{a2}$ will always have difference. As such, the current can be divided into a common mode (CM) component and a differential mode (DM) component. The CM and DM components can be expressed as below, $$i_{cm}=(i_{a1}+i_{a2})/2 \quad (1)$$

$$i_{dm}=(i_{a1}-i_{a2})/2 \quad (2)$$

wherein $i_{cm}$ represents the CM current component, $i_{dm}$ represents the DM current component, $i_{a1}$ represents the current in the first branch, and $i_{a2}$ represents the current in the second branch. As such, the branch currents can be expressed as below, $$i_{a1}=i_{cm}+i_{dm} \quad (3)$$

$$i_{a2}=i_{cm}-i_{dm} \quad (4)$$

The phase current and circulating current can be expressed as below.

$$i_a=i_{a1}+i_{a2}=2i_{cm} \quad (5)$$

$$i_{cir}=i_{dm} \quad (6)$$

wherein, $i_a$ represents the phase current, and $i_{cir}$ represents the circulating current. As can be seen from (5)~(6) that the CM current $i_{cm}$ is the useful phase current, while the DM current $i_{dm}$ is the undesired circulating current. The circulating current is the DM current that does not contribute to power conversion, but increases current ripple and loss, so the circulating current should be suppressed to achieve high efficiency.

Figure 4:
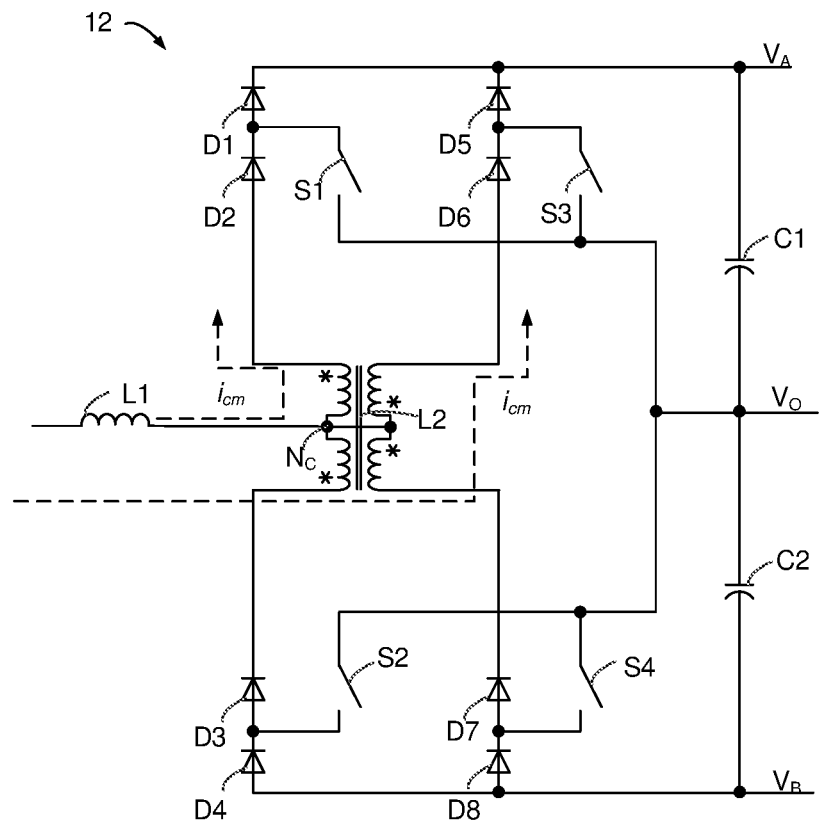
FIG. 4 illustrates an example of common mode component of current in the phase circuit of FIG. 3 in accordance with some example embodiments of the present disclosure.

FIG. 4 illustrates an example of common mode component of current in the phase circuit of FIG. 3 in accordance with some example embodiments of the present disclosure. The CM component $i_{cm}$ in the first branch flows through the inductor L1 and the first winding W1 in the first branch to the first DC terminal $V_A$ to charge the capacitor C1. Analogously, the CM component $i_{cm}$ in the second branch flows through the inductor L1 and the third winding W3 in the second branch to the first DC terminal $V_A$ to charge the capacitor C1.

As stated above, the CM component is useful for conversion, and the CM component of a current will not be suppressed, as stated below with reference to FIG. 5.

Figure 5:
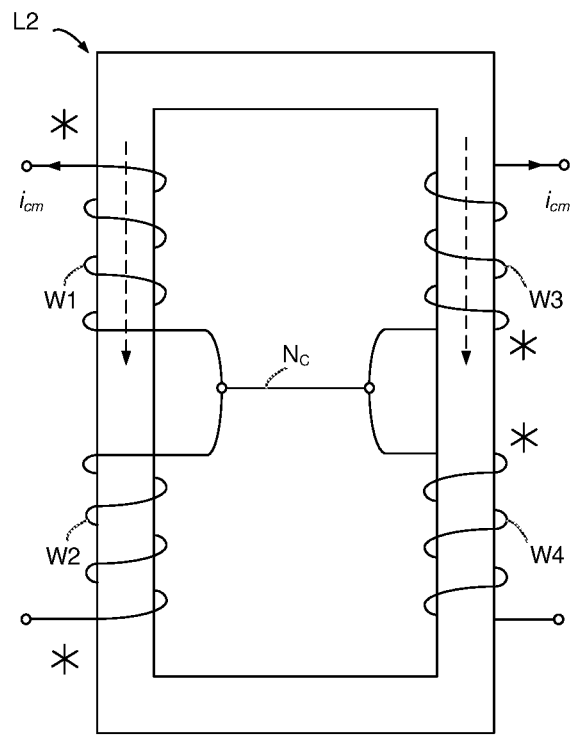
FIG. 5 illustrates an example of windings around the magnetic core with flux corresponding to the common mode component of current of FIG. 4 in accordance with some example embodiments of the present disclosure.

FIG. 5 illustrates an example of windings around the magnetic core with flux corresponding to the common mode component of current of FIG. 4 in accordance with some example embodiments of the present disclosure. In FIG. 5, dotted terminals of the windings are marked with "✲". Analogous reference mark "✲" may apply to subsequent figures to indicate dotted terminals.

Dotted terminals of the first and second windings W1 and W2 are terminals away from the common node ($N_C$), and dotted terminals of the third and fourth windings are terminals coupled to the common node ($N_C$). FIG. 5 also shows a first flux generated by the CM component $i_{cm}$ in the first branch and a second flux generated by the CM component $i_{cm}$ in the second branch.

The first flux and the second flux are generated to be in the same direction, for example, in a direction from the first winding to the second winding. As such, the first flux and the second flux cancel with each other, such that inductance of the first and second windings W1 and W2 would be decreased. This would facilitate voltage conversion.

Although a configuration of the first, second, third and fourth windings around the magnetic core L2 is illustrated in FIG. 5, this is only for illustration without suggesting any limitations as to the scope of the subject matter described here. Other configurations may be applied, as long as the first flux generated by the CM component $i_{cm}$ in the first branch and the second flux generated by the CM component $i_{cm}$ in the second branch cancel with each other.

Although a rectangular shape of core L2 is illustrated, this is only for illustration without suggesting any limitations as to the scope of the subject matter described here. The magnetic core L2 could be any shape such as circular, EI or double E, UU, PQ and so on. The core does not limit to any magnetic material. The layout of the windings could be in any way, as long as the first flux generated by the CM component $i_{cm}$ in the first branch and the second flux generated by the CM component $i_{cm}$ in the second branch cancel with each other.

Figure 6:
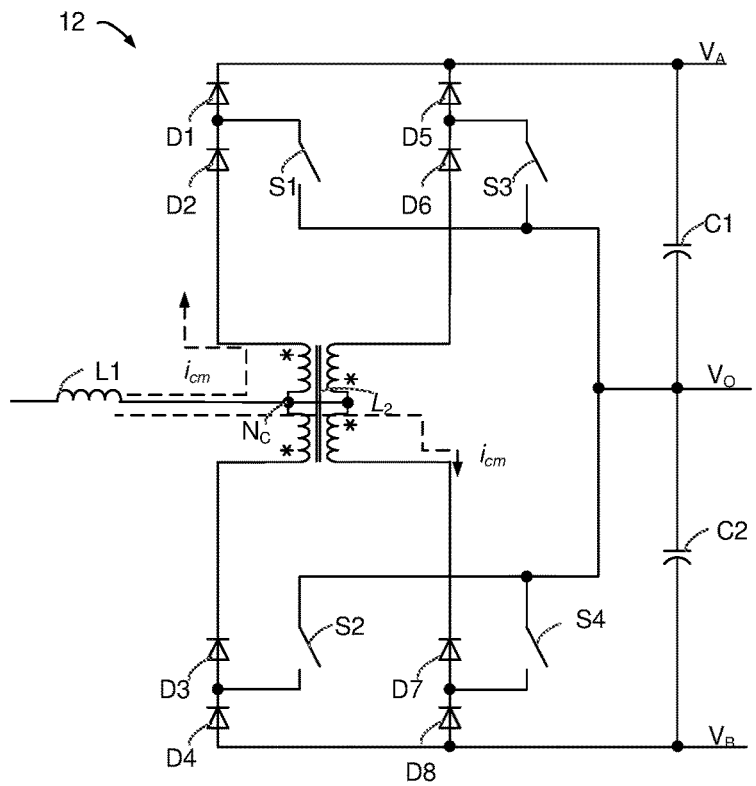
FIG. 6 illustrates another example of common mode component of current in the phase circuit of FIG. 3 in accordance with some example embodiments of the present disclosure.

FIG. 6 illustrates another example of common mode component of current in the phase circuit of FIG. 3 in accordance with some example embodiments of the present disclosure. In the example, the CM component $i_{cm}$ in the first branch flows through the inductor L1 and the first winding W1 in the first branch to the first DC terminal $V_A$ to charge the capacitor C1. The CM component $i_{cm}$ in the second branch flows through the inductor L1 and the fourth winding W4 in the second branch to the second DC terminal $V_B$ to charge the capacitor C2.

As stated above, the CM component is useful for conversion. As such, the CM component of a current is not suppressed, as described below with reference to FIG. 7.

Figure 7:
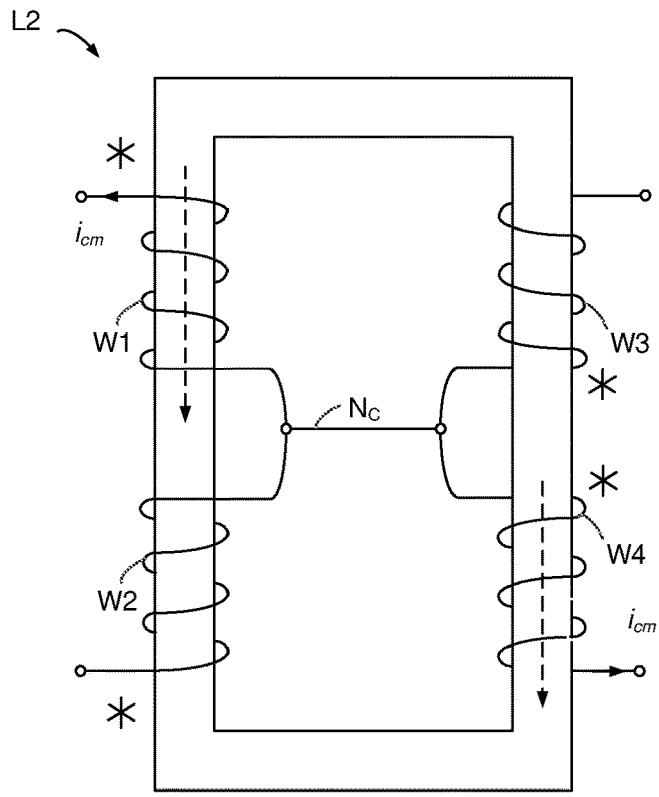
FIG. 7 illustrates an example of windings around the magnetic core with flux corresponding to the common mode component of current of FIG. 6 in accordance with some example embodiments of the present disclosure.

FIG. 7 illustrates an example of windings around the magnetic core with flux corresponding to the common mode component of current of FIG. 6 in accordance with some example embodiments of the present disclosure. By the configuration of FIG. 7, the CM component of a current is not suppressed.

Dotted terminals of the first, second, third and fourth windings W1, W2, W3 and W4 are the same as those of FIG. 5. Thus, the description of the dotted terminals is omitted here for brevity. FIG. 7 also shows a first flux generated by the CM component $i_{cm}$ in the first branch and a second flux generated by the CM component $i_{cm}$ in the second branch.

The first flux and the second flux are generated to be in the same direction, for example, in a direction from the first winding to the second winding. As such, the first flux and the second flux cancel with each other, such that inductance of the first and fourth windings W1 and W4 would be decreased. This would facilitate voltage conversion.

Figure 8:
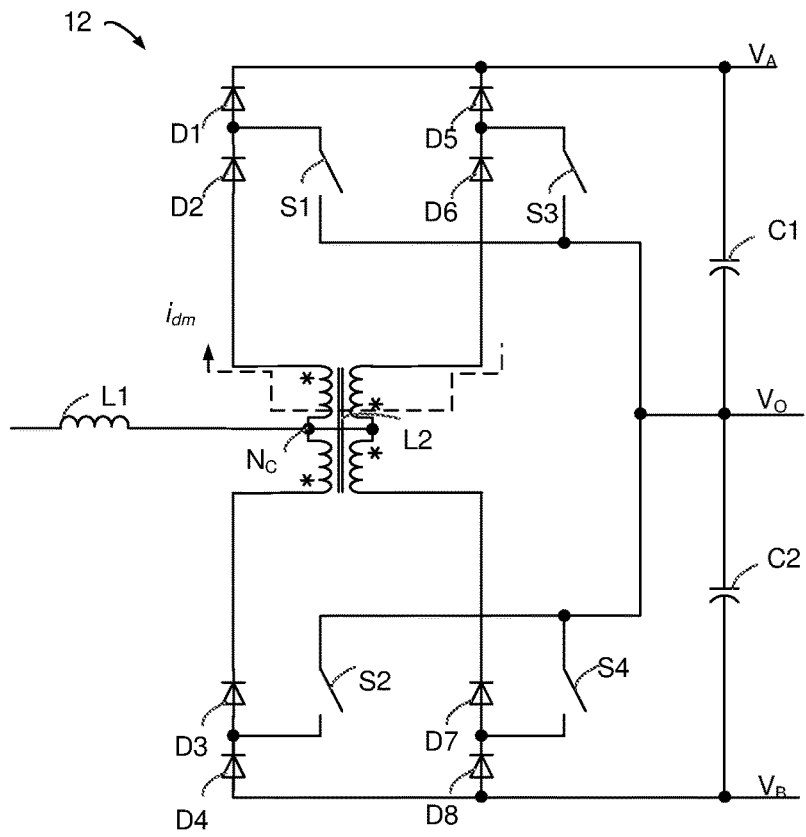
FIG. 8 illustrates an example of differential mode component of current in the phase circuit of FIG. 3 in accordance with some example embodiments of the present disclosure.

FIG. 8 illustrates an example of differential mode (DM) component of current in the phase circuit of FIG. 3 in accordance with some example embodiments of the present disclosure. The electrical configuration of FIG. 8 is the same as that of FIG. 6. The DM component of a current is illustrated in FIG. 8.

In the example, the DM component $i_{dm}$ flows from third winding in the second branch through the common node $N_C$ to the first winding in the first branch, such that the DM component $i_{dm}$ is circulating in the first phase circuit 12. As such, the DM component $i_{dm}$, if not suppressed, will cause an energy waste in the circulation without converting into useful energy, and needs to be suppressed, as shown in FIG. 9.

Figure 9:
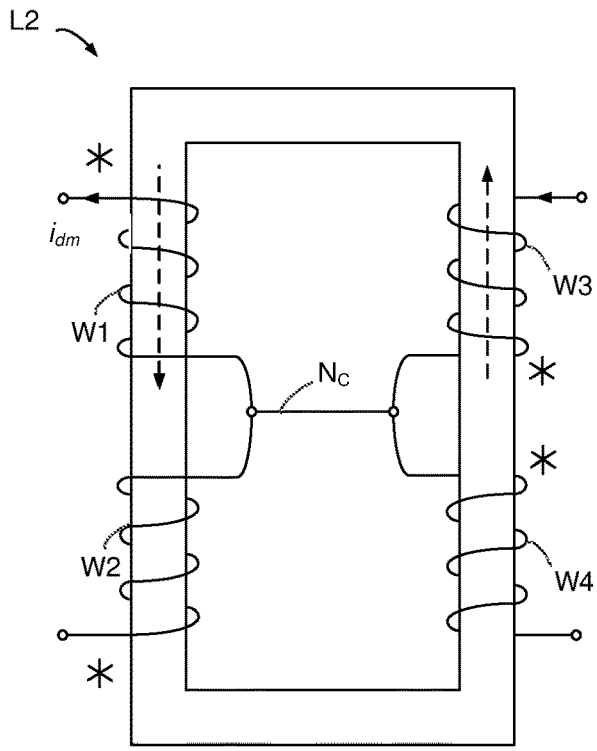
FIG. 9 illustrates an example of windings around the magnetic core with flux corresponding to the common mode component of current of FIG. 8 in accordance with some example embodiments of the present disclosure.

FIG. 9 illustrates an example of windings around the magnetic core with flux corresponding to the common mode component of current of FIG. 8 in accordance with some example embodiments of the present disclosure. By the configuration of FIG. 9, the DM component of a current can be suppressed.

Dotted terminals of the first, second, third and fourth windings W1, W2, W3 and W4 are the same as those of FIG. 5. Thus, the description of the dotted terminals is omitted here for brevity. FIG. 9 also shows a first flux generated by the $i_{dm}$ in the first branch and a second flux generated by the $i_{dm}$ in the second branch.

The first flux and the second flux are generated to be in the different directions. As such, the first flux and the second flux will enhance with each other, such that inductance of the first and fourth windings W1 and W3 would increase accordingly. Due to the increasing of the inductance of the windings, the DM component of the circulating current is suppressed. As such, the useless DM component can be suppressed at a lower level, and more energy can be converted into useful energy.

Figure 10:
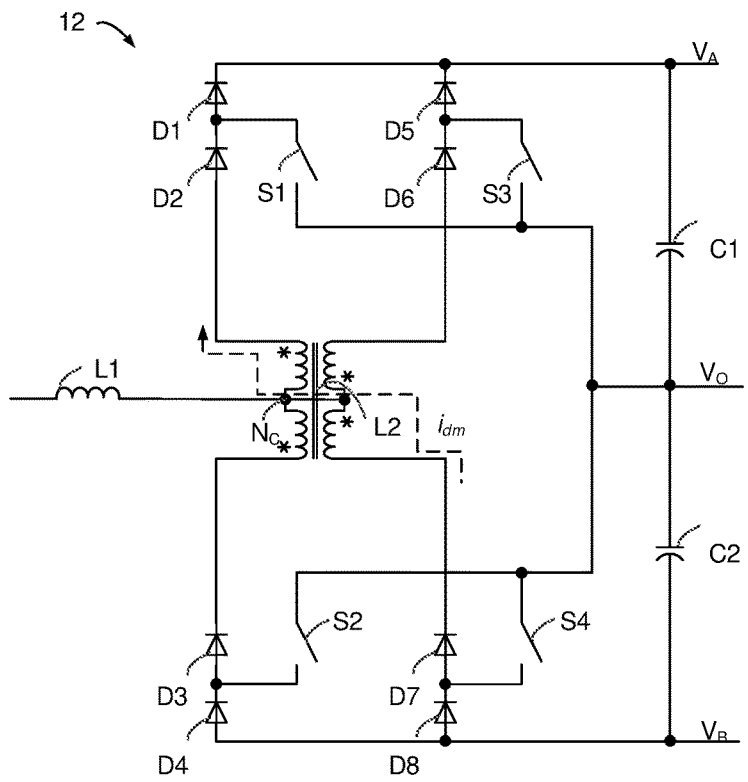
FIG. 10 illustrates another example of differential mode component of current in the phase circuit of FIG. 3 in accordance with some example embodiments of the present disclosure.

FIG. 10 illustrates another example of differential mode component of current in the phase circuit of FIG. 3 in accordance with some example embodiments of the present disclosure. The electrical configuration of FIG. 10 is the same as that of FIG. 3. The differential mode (DM) component of a current is illustrated in FIG. 10.

In the example, the DM component $i_{dm}$ flows from fourth winding W4 in the second branch through the common node $N_C$ to the first winding W1 in the first branch, such that the DM component $i_{dm}$ is circulating in the first phase circuit 12. As such, the DM component $i_{dm}$, if not suppressed, will cause an energy waste in the circulation without converting into useful energy, and needs to be suppressed, as shown in FIG. 11.

Figure 11:
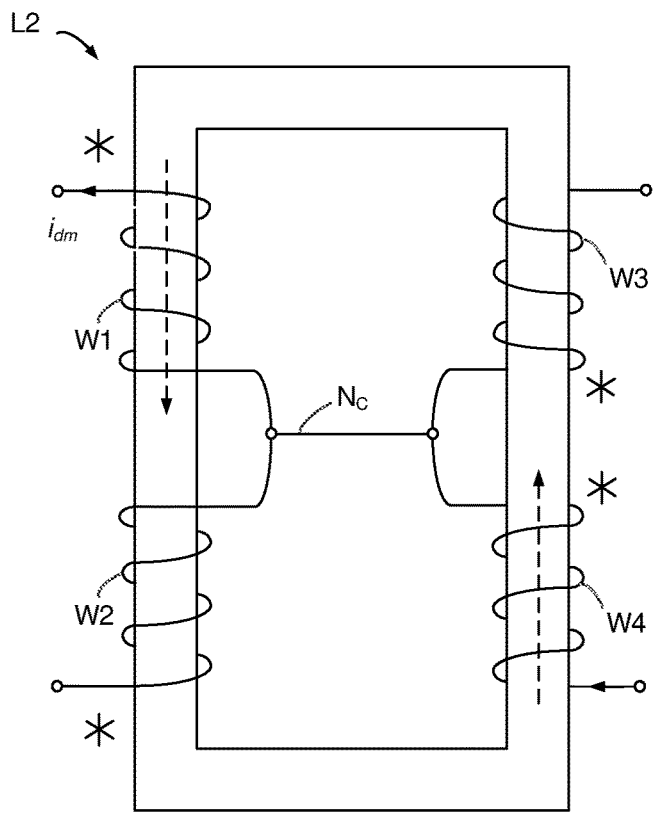
FIG. 11 illustrates an example of windings around the magnetic core with flux corresponding to the common mode component of current of FIG. 10 in accordance with some example embodiments of the present disclosure.

FIG. 11 illustrates an example of windings around the magnetic core with flux corresponding to the common mode component of current of FIG. 10 in accordance with some example embodiments of the present disclosure. By the configuration of FIG. 11, the DM component of a current can be suppressed.

Dotted terminals of the first, second, third and fourth windings W1, W2, W3 and W4 are the same as those of FIG. 5. Thus, the description of the dotted terminals is omitted here for brevity. FIG. 11 also shows a first flux generated by the $i_{dm}$ in the first branch and a second flux generated by the $i_{dm}$ in the second branch.

The first flux and the second flux are generated to be in the different directions. As such, the first flux and the second flux will enhance with each other, such that inductance of the first and fourth windings W1 and W4 would be increased. Due to the increasing of the inductance of the windings, the DM component of the circulating current is suppressed by the increased inductance. Thus, the useless DM component can be suppressed at a lower level, and more energy can be converted into useful energy.

By the configuration as illustrated in FIGS. 2-11, harmonics from the interleaved legs can be cancelled causing a better harmonic performance and helping to reduce a size of the AC boost inductor. Also, the circulating current is effectively suppressed by the configuration of windings around the core L2 leading to a lower current ripple and high efficiency. To sum up, the configuration of the embodiments of the present disclosure may achieve a high efficiency and reduce cost, as stated above.

Although FIGS. 3-11 illustrate a specific configuration of a phase circuit and its principle for CM and DM components, this is only for illustration without suggesting any limitations as to the scope of the subject matter described here. For example, other configurations are possible, as described below.

Figure 12:
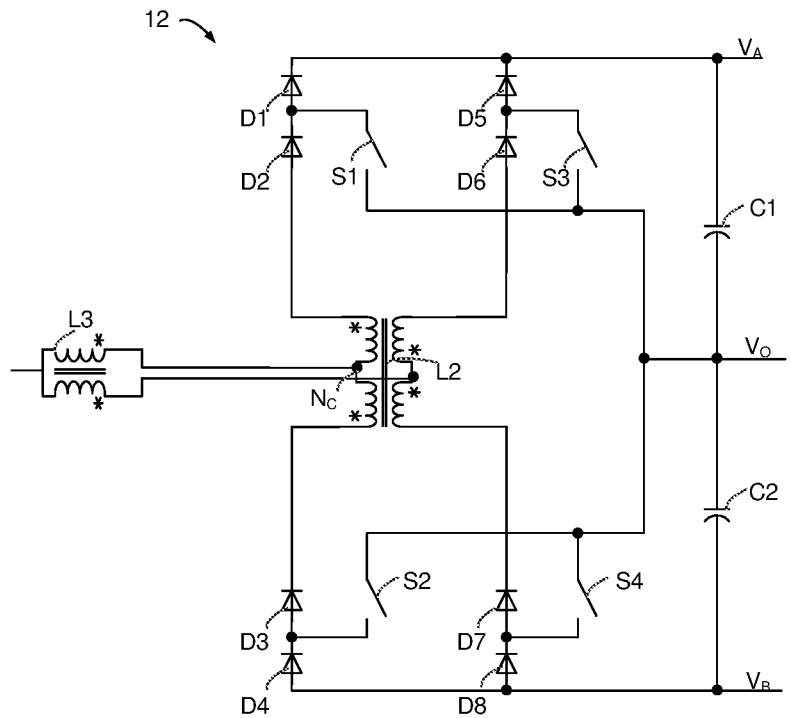
FIG. 12 illustrates another example of a phase circuit of the converter of FIG. 2 in accordance with some example embodiments of the present disclosure.

FIG. 12 illustrates another example of a phase circuit 12 of the converter of FIG. 2 in accordance with some example embodiments of the present disclosure. The phase circuit 12 of FIG. 12 is similar to the phase circuit of FIG. 3 except for the CM inductor L3. The CM inductor L3 includes a first winding connecting to the common node $N_C$ between the first and second windings in the first branch, and a second winding connecting to the intermediate node between the third and fourth winding W3 and W4 in the second branch.

The configuration of FIG. 12 operates in a similar manner as that of FIG. 3. In other words, operation for Table 1 can be also applied to the configuration of FIG. 12. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 13:
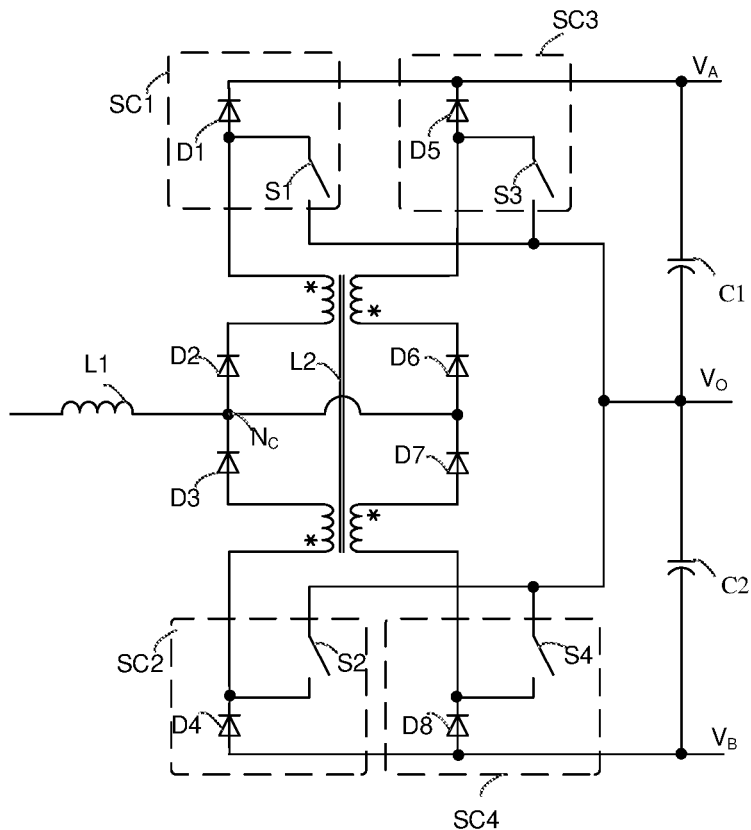
FIG. 13 illustrates a further example of a phase circuit of the converter of FIG. 2 in accordance with some example embodiments of the present disclosure.

FIG. 13 illustrates a further example of a phase circuit 12 of the converter of FIG. 2 in accordance with some example embodiments of the present disclosure. The phase circuit 12 of FIG. 12 is similar to the phase circuit 12 of FIG. 3 except for positions of the second, third, sixth and seventh diodes D2, D3, D6 and D7. The second diode D2 is located between the common node $N_C$ and the first winding, the third diode D3 is located between the common node $N_C$ and the second winding, the sixth diode D6 is located between the common node $N_C$ and the third winding, and the seventh diode D7 is located between the common node $N_C$ and the fourth winding.

The configuration of FIG. 12 operates in a similar manner as that of FIG. 3. In other words, operation for Table 1 can be also applied to the configuration of FIG. 13. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 14:
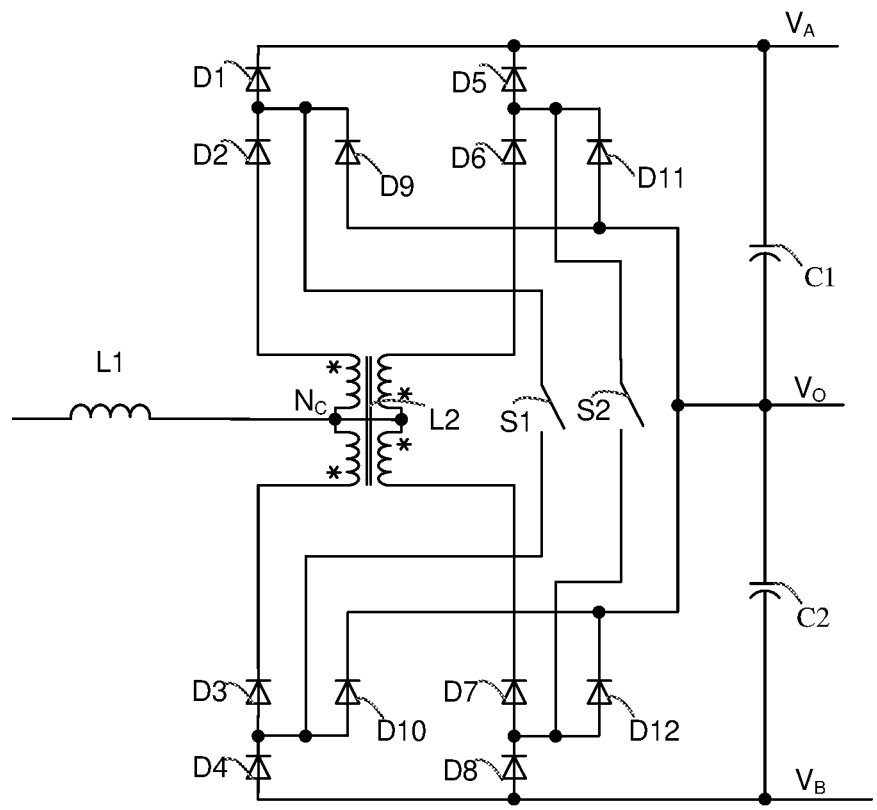
FIG. 14 illustrates a further example of a phase circuit of the converter of FIG. 2 in accordance with some example embodiments of the present disclosure.

FIG. 14 illustrates a further example of a phase circuit 12 of the converter of FIG. 2 in accordance with some example embodiments of the present disclosure. The phase circuit 12 of FIG. 14 is similar to the phase circuit of FIG. 3 except for the switching elements. As an alternative for the first switch S1 in FIG. 3, a ninth diode D9 is provided between the intermediate node between the first and second diodes D1 and D2 and the neutral node $V_O$ in FIG. 14, and a switch S1 is provided between the intermediate node between the first and second diodes D1 and D2 and the intermediate node between the third and fourth diodes D3 and D4. The second, third and fourth switch S2, S3 and S4 in FIG. 3 can be alternatively replaced by the tenth, eleventh, twelfth diodes D10, D11, and D12 and the first and second switches S1 and S2 in FIG. 14.

The configuration of FIG. 14 operates in a similar manner as that of FIG. 3. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch enhance with each other and the inductance will increase accordingly.

Figure 15:
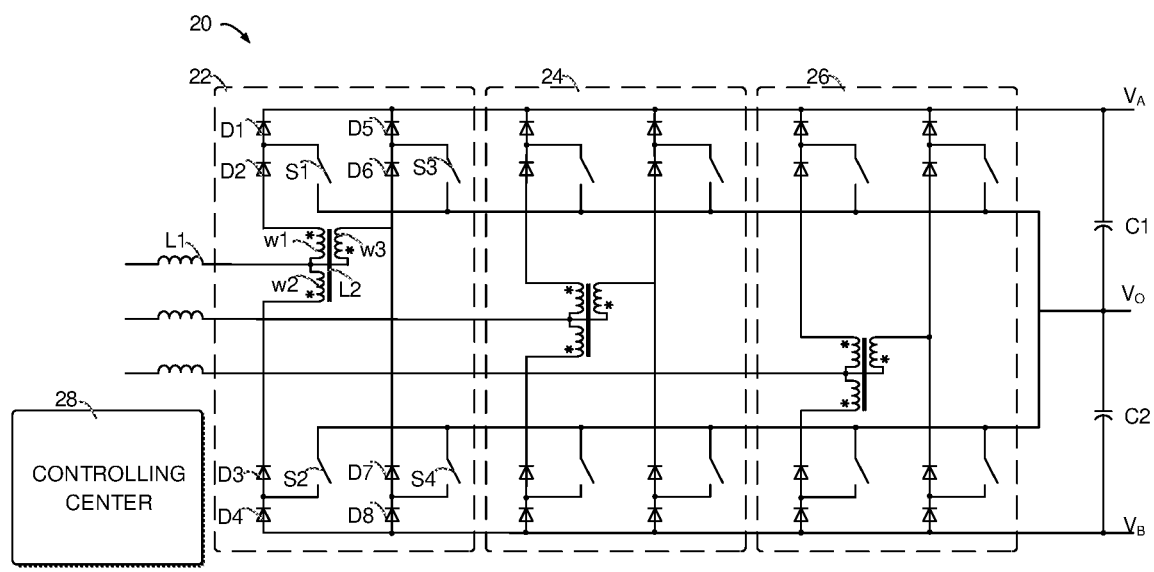
FIG. 15 illustrates another example of converter in accordance with some example embodiments of the present disclosure.

FIG. 15 illustrates another example of converter 20 in accordance with some example embodiments of the present disclosure. The converter 20 is a five-level converter, and is configured to convert an AC voltage into a DC voltage between the DC terminals $V_A$ and $V_B$. Although a five-level converter 20 is illustrated, this is only for illustration without suggesting any limitations as to the scope of the subject matter described here. For example, embodiments of the disclosure may include a DC-AC electric system, as described below with reference to FIG. 28.

The converter 20 includes a first phase circuit 22, a second phase circuit 24 and a third phase circuit 26. Each phase circuit is configured to convert an AC current from a phase circuit of the AC source 11 into a DC current. For example, the first phase circuit 22 is coupled to the AC source 11 via a boost inductor L1, and configured to convert an AC current from a phase circuit of the AC source 11 into a DC current such that a DC voltage may be provided across the first and second DC terminals $V_A$ and $V_B$.

The first phase circuit 22, the second phase circuit 24 and the third phase circuit 26 have the same configuration in FIG. 15. Thus, only the first phase circuit 22 will be described below for brevity, and the second phase circuit 24 and the third phase circuit 26 operate analogously. Although the first, second and third phase circuits employ the same configuration, this is only for illustration without suggesting any limitations as to the scope of the subject matter described here. For example, the first, second and third phase circuits employ different configurations in the variants of the present disclosure.

The converter 20 is a five-level converter in FIG. 15, and the voltage between the common node $N_C$ and the neutral node $N_O$ may present a voltage at five potential levels. The principle for the five potential levels will be described below. Although a five-level converter 20 is illustrated, this is only for illustration without suggesting any limitations as to the scope of the subject matter described here. For example, three-level or more-level, such as seven-level or nine-level, may be included in the scope of the subject matter described here.

The converter 20 includes a controlling center 28 to control operations of switches in switching circuit in the first, second and third phase circuits 22, 24 and 26. The couplings of the controlling center 28 to the switches in the converter 20 are not illustrated to avoid blurring the figure. Although the couplings are not illustrated, it is understood that the controlling center 28 couples to the switches in the converter 20 directly or indirectly.

The first phase circuit 22 includes a first branch and a second branch. The first branch is coupled between the first DC terminal $V_A$ and the second DC terminal $V_B$, and includes a first winding W1 and a second winding W2 around a magnetic core L2. The first winding and the second winding are coupled to the AC terminal via a common node $N_C$.

The second branch is coupled in parallel to the first branch between the first and second DC terminals $V_A$ and $V_B$, and includes a third winding W3 around the magnetic core L2. The third winding W3 is coupled to the AC terminal via the common node $N_C$ such that the first and second branches are configured to convert a first voltage into a second voltage. The first, second and third windings are configured to cause magnetic flux generated by DM component of a first current in the first branch and magnetic flux generated by DM component of a second current in the second branch to enhance with each other.

Figure 16:
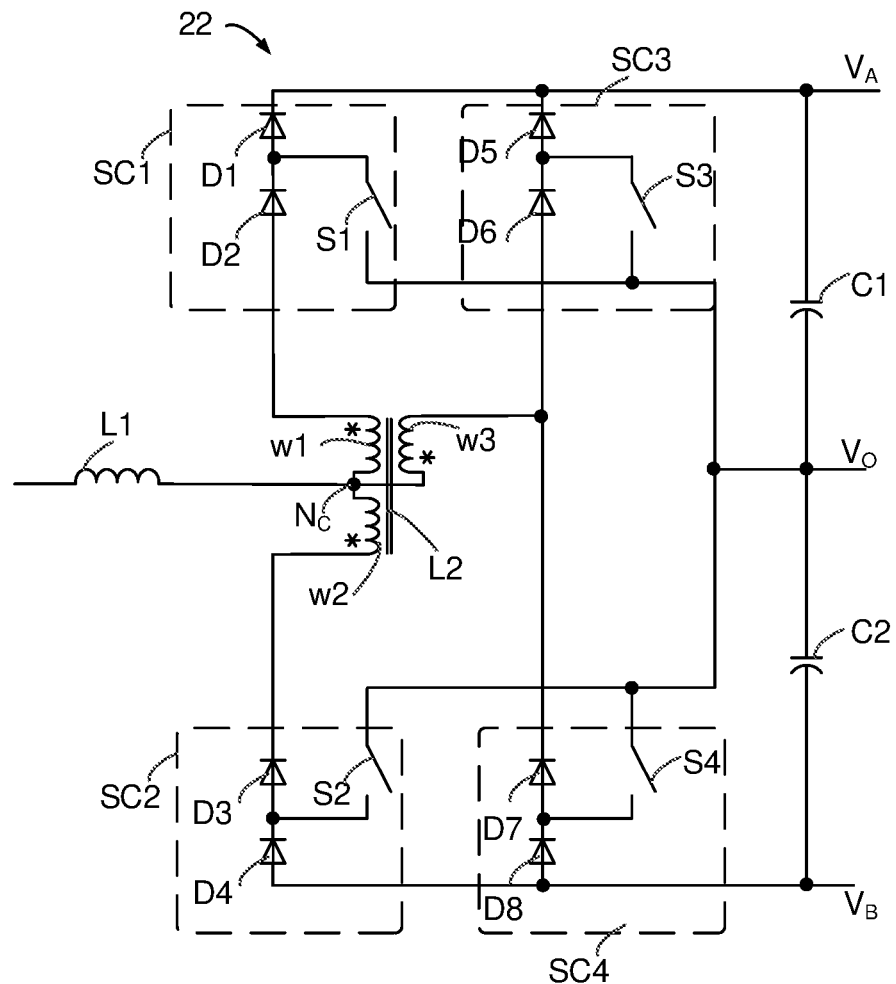
FIG. 16 illustrates an example of a phase circuit of the converter of FIG. 15 in accordance with some example embodiments of the present disclosure.

FIG. 16 illustrates an example of the first phase circuit 22 of the converter of FIG. 15 in accordance with some example embodiments of the present disclosure. The first phase circuit 22 includes the first winding W1 and the second winding W2 in the first branch and around the magnetic core L2, and the third winding W3 in the second branch and around the magnetic core L2.

The first, second and third windings W1, W2 and W3 are coupled together to share a common node $N_C$. As such, the first and second branches are interleaved. The first branch includes a first switching circuit SC1 coupled between the first winding W1 and the first DC terminal $V_A$ and a second switching circuit SC2 between the second winding W2 and the second DC terminal $V_B$. The second branch includes a third switching circuit SC3 coupled between the third winding W3 and the first DC terminal $V_A$ and a fourth switching circuit SC4 between the third winding W3 and the second DC terminal $V_B$.

The first switching circuit includes a first diode D1 and a second diode D2 coupled in series and a first switch S1 coupled to an intermediate node between the first and second diodes and the neutral node $N_O$. The second, third and fourth switching circuits SC1, SC2 and SC3 are substantially the same as the first switching circuit SC1. Thus, the description for the second, third and fourth switching circuits SC1, SC2 and SC3 are omitted here for brevity.

To sum up, a serial connection of the first winding W1 and the first switching circuit SC1 is coupled with the first DC terminal $V_A$ and the common node $N_C$. A serial connection of the third winding W3 and the third switching circuit SC3 is coupled in parallel to the serial connection of the first winding W1 and the first switching circuit S1.

A serial connection of the second winding W2 and the second switching circuit SC2 is coupled with the second DC terminal $V_B$ and the common node $N_C$. In FIG. 16, the second branch further includes a fourth switching circuit SC4 coupled with the third winding W3 and the second DC terminal $V_B$.

Assuming that the DC-link voltage across the first and second DC terminals $V_A$ and $V_B$ is $V_{AB}$, the voltage across each of the capacitors C1 and C2 is $V_{AB}$. The capacitors C1 and C2 are DC side capacitors denoting DC bus. Assuming that the potential of the neutral node $V_O$ is '0'. In this event, the phase voltage $V_P$, namely the voltage between the common node $N_C$ and the neutral node $N_O$, has five voltage levels in this topology.

The five voltage levels, corresponding to the phase voltages and device switching states are shown in Table 1. The five voltage levels are represented by '2', '1', '0', '-1' and '-2'. Their corresponding five phase voltages are '$V_{AB}/2$', '$V_{AB}/4$', '0', '-$V_{AB}/4$' and '-$V_{AB}/2$'. In modulation, the two branches will be controlled in interleaved way, and the five voltage levels will reveal themselves automatically. In table 1, the state of turning-on is represented by '1', and the state of turning-off is represented by '0'. For example, the symbol '1' for the first switch S1 or the first diode D1 represents that the first switch S1 or the first diode D1 is turned on, and the symbol '0' for the first switch S1 or the first diode D1 represents that the first switch S1 or the first diode D1 is turned off.

difference. As such, the current can be divided into a common mode (CM) component and a differential mode (DM) component. The CM and DM components can be expressed as below, $$i_{cm}=(i_{a1}+i_{a2})/2 \tag{7}$$

$$i_{dm}=(i_{a1}-i_{a2})/2 \tag{8}$$

wherein $i_{cm}$ represents the CM current component, $i_{dm}$ represents the DM current component, $i_{a1}$ represents the current in the first branch, and $i_{a2}$ represents the current in the second branch. As such, the branch currents can be expressed as below, $$i_{a1}=i_{cm}+i_{dm} \tag{9}$$

$$i_{a2}=i_{cm}-i_{dm} \tag{10}$$

The phase current and circulating current can be expressed as below.

$$i_a=i_{a1}+i_{a2}=2i_{cm} \tag{11}$$

$$i_{cir}=i_{dm} \tag{12}$$

wherein $i_a$ represents the phase current, and $i_{cir}$ represents the circulating current. As can be seen from (11)~(12) that the CM current $i_{cm}$ is the useful phase current, while the DM current $i_{dm}$ is the undesired circulating current. The circulating current is the DM current that does not contribute to power conversion, but increases current ripple and loss, so the circulating current should be suppressed to achieve high efficiency.

Figure 17:
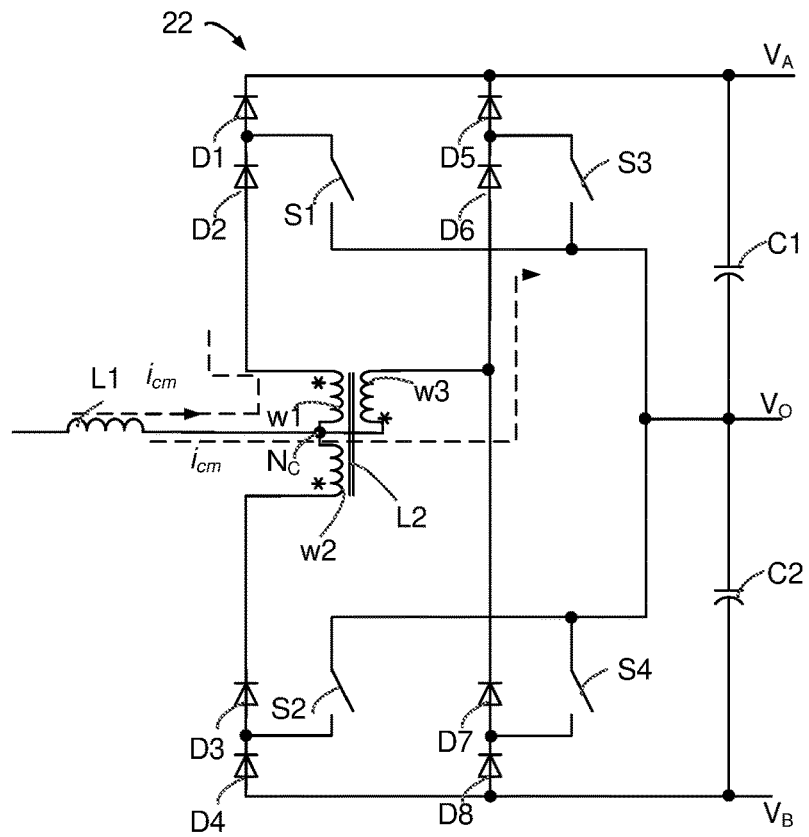
FIG. 17 illustrates an example of common mode component of current in the phase circuit of FIG. 16 in accordance with some example embodiments of the present disclosure.

FIG. 17 illustrates an example of common mode component of current in the phase circuit of FIG. 16 in accordance with some example embodiments of the present disclosure. The CM component $i_{cm}$ in the first branch flows through the inductor L1 and the first winding W1 in the first branch to the first DC terminal $V_A$ to charge the capacitor C1. Analogously, the CM component $i_{cm}$ in the second branch flows

TABLE 2

Voltage level and device switching state of the converter

| Voltage Level | Phase Voltage, ($V_p$) | Device switching state (1-conduct; 0-not conduct) | | | | | | | | | | | |
|---|---|---|---|---|---|---|---|---|---|---|---|---|---|
| | | S1 | S2 | D1 | D2 | D3 | D4 | S3 | S4 | D5 | D6 | D7 | D8 |
| 2 | $V_{AB}/2$ | 0 | 0 | 1 | 1 | 0 | 0 | 0 | 0 | 1 | 1 | 0 | 0 |
| 1 | $V_{AB}/4$ | 0 | 0 | 1 | 1 | 0 | 0 | 1 | 0 | 0 | 1 | 0 | 0 |
| | | 0 | 0 | 1 | 1 | 0 | 0 | 0 | 1 | 0 | 0 | 1 | 0 |
| | | 1 | 0 | 0 | 1 | 0 | 0 | 0 | 0 | 1 | 1 | 0 | 0 |
| | | 0 | 1 | 0 | 0 | 1 | 0 | 0 | 0 | 1 | 1 | 0 | 0 |
| 0 | 0 | 1 | 0 | 0 | 1 | 0 | 0 | 1 | 0 | 0 | 1 | 0 | 0 |
| | | 1 | 0 | 0 | 1 | 0 | 0 | 0 | 1 | 0 | 0 | 1 | 0 |
| | | 0 | 1 | 0 | 0 | 1 | 0 | 1 | 0 | 0 | 1 | 0 | 0 |
| | | 0 | 1 | 0 | 0 | 1 | 0 | 0 | 1 | 0 | 0 | 1 | 0 |
| | | 0 | 0 | 1 | 1 | 0 | 0 | 0 | 0 | 0 | 0 | 1 | 1 |
| | | 0 | 0 | 0 | 0 | 1 | 1 | 0 | 0 | 1 | 1 | 0 | 0 |
| -1 | $-V_{AB}/4$ | 0 | 0 | 0 | 0 | 1 | 1 | 1 | 0 | 0 | 1 | 0 | 0 |
| | | 0 | 0 | 0 | 0 | 1 | 1 | 0 | 1 | 0 | 0 | 1 | 0 |
| | | 1 | 0 | 0 | 1 | 0 | 0 | 0 | 0 | 0 | 0 | 1 | 1 |
| | | 0 | 1 | 0 | 0 | 1 | 0 | 0 | 0 | 0 | 0 | 1 | 1 |
| -2 | $-V_{AB}/2$ | 0 | 0 | 0 | 0 | 1 | 1 | 0 | 0 | 0 | 0 | 1 | 1 |

It is to be understood that the switching operation for the switches are controlled by the controlling center 18, and the state of the diodes are based on current direction. Assuming that the currents in the first and second branches are $i_{a1}$ and $i_{a2}$ respectively. The two currents $i_{a1}$ and $i_{a2}$ will always have through the inductor L1 and the third winding W3 in the second branch to the first DC terminal $V_A$ to charge the capacitor C1.

It can be seen that, the configuration of FIG. 17 is similar to that of FIG. 3 with elimination for the fourth winding W4.

The configuration of FIG. 17 can operate similarly without the fourth winding W4. As stated above, the CM component is useful for conversion, and the CM component of a current will not be suppressed, as stated below with reference to FIG. 18.

Figure 18:
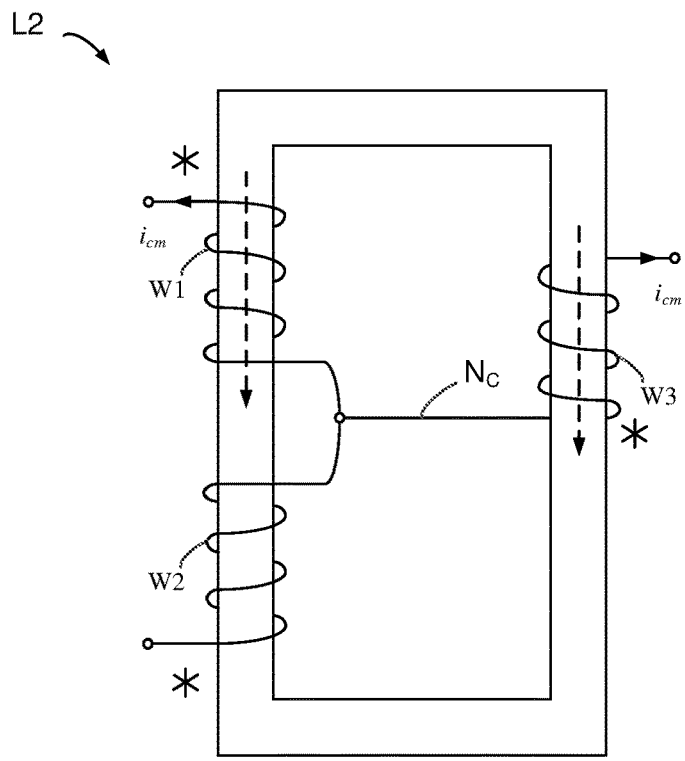
FIG. 18 illustrates an example of windings around the magnetic core with flux corresponding to the common mode component of current of FIG. 17 in accordance with some example embodiments of the present disclosure.

FIG. 18 illustrates an example of windings around the magnetic core with flux corresponding to the common mode component of current of FIG. 17 in accordance with some example embodiments of the present disclosure.

Dotted terminals of the first and second windings W1 and W2 are terminals away from the common node ($N_C$), and dotted terminals of the third winding is a terminal coupled to the common node ($N_C$). FIG. 17 also shows a first flux generated by the CM component $i_{cm}$ in the first branch and a second flux generated by the CM component $i_{cm}$ in the second branch.

The first flux and the second flux are generated to be in the same direction, for example, in a direction from the first winding to the second winding. As such, the first flux and the second flux cancel with each other, such that inductance of the first and second windings W1 and W2 would be decreased. This would facilitate voltage conversion.

Although a configuration of the first, second and third windings around the magnetic core L2 is illustrated in FIG. 5, this is only for illustration without suggesting any limitations as to the scope of the subject matter described here. Other configurations may be applied, as long as the first flux generated by the CM component $i_{cm}$ in the first branch and the second flux generated by the CM component $i_{cm}$ in the second branch cancel with each other.

Figure 19:
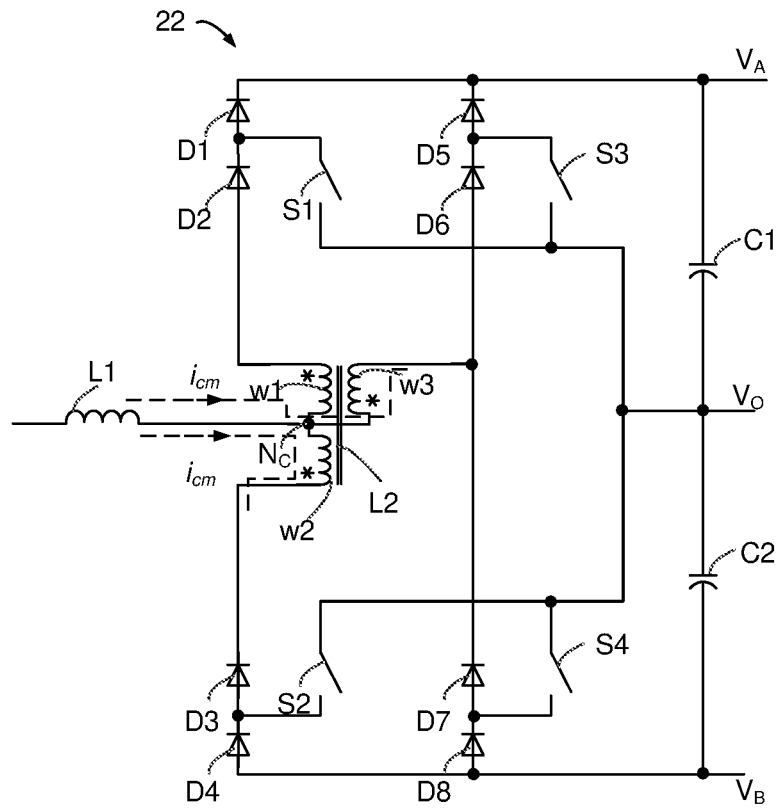
FIG. 19 illustrates another example of common mode component of current in the phase circuit of FIG. 16 in accordance with some example embodiments of the present disclosure.

FIG. 19 illustrates another example of common mode component of current in the phase circuit of FIG. 16 in accordance with some example embodiments of the present disclosure.

In the example, the CM component $i_{cm}$ flows in the second branch from the inductor L1, through the third winding W3 to the first DC terminal $V_A$ to charge the capacitor C1. The CM component $i_{cm}$ flows in the first branch flows from the inductor L1, through the second winding W2 to the second DC terminal $V_B$ to charge the capacitor C2.

As stated above, the CM component is useful for conversion. As such, the CM component of a current is not suppressed as described below with reference to FIG. 20.

Figure 20:
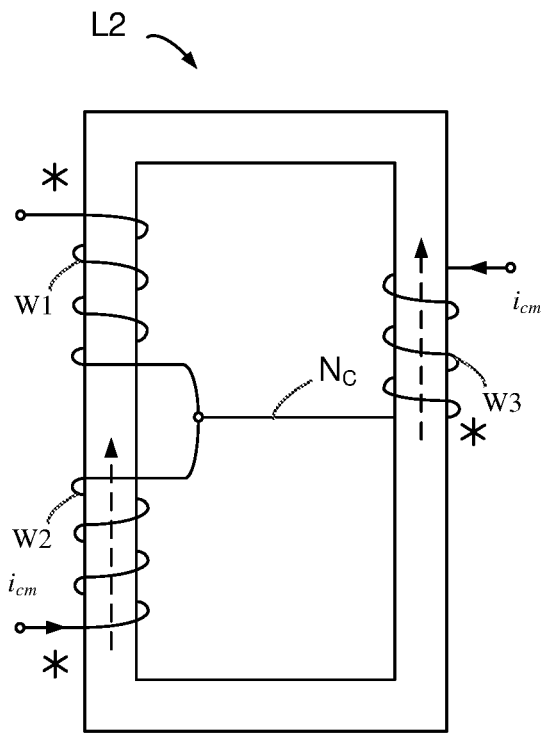
FIG. 20 illustrates an example of windings around the magnetic core with flux corresponding to the common mode component of current of FIG. 19 in accordance with some example embodiments of the present disclosure.

FIG. 20 illustrates an example of windings around the magnetic core with flux corresponding to the common mode component of current of FIG. 19 in accordance with some example embodiments of the present disclosure. By the configuration of FIG. 20, the CM component of a current is not suppressed.

Dotted terminals of the first, second and third windings W1, W2 and W3 are the same as those of FIG. 18. Thus, the description of the dotted terminals is omitted here for brevity. FIG. 20 also shows a first flux generated by the CM component $i_{cm}$ in the first branch and a second flux generated by the CM component $i_{cm}$ in the second branch.

The first flux and the second flux are generated to be in the same direction, for example, in a direction from the second winding to the first winding. As such, the first flux and the second flux cancel with each other, such that inductance of the second and third windings W2 and W3 would be decreased. This would facilitate voltage conversion.

Figure 21:
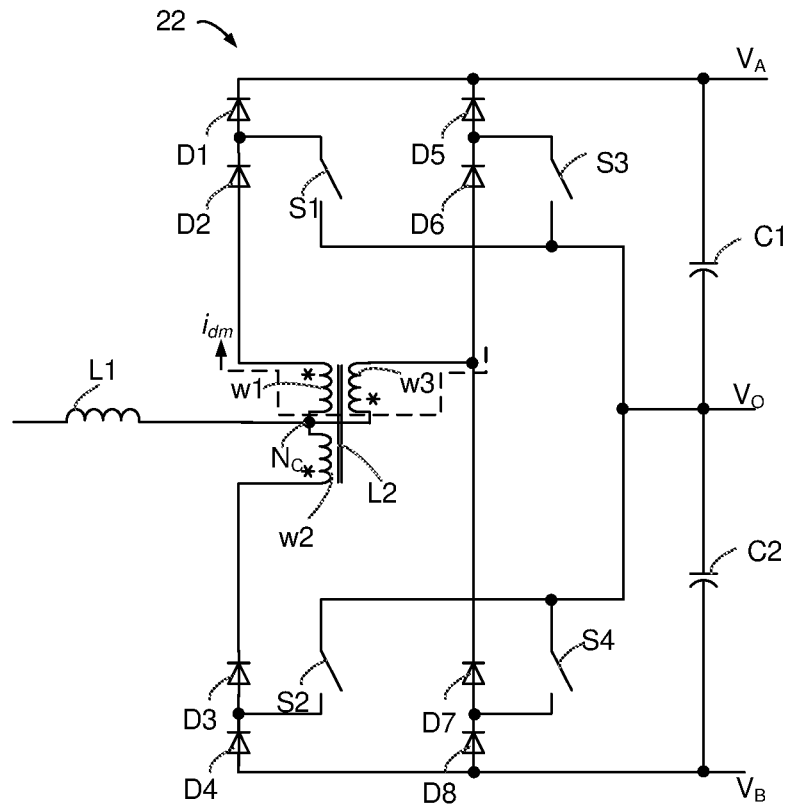
FIG. 21 illustrates an example of differential mode component of current in the phase circuit of FIG. 16 in accordance with some example embodiments of the present disclosure.

FIG. 21 illustrates an example of DM component of current in the phase circuit of FIG. 16 in accordance with some example embodiments of the present disclosure. The electrical configuration of FIG. 21 is the same as that of FIG. 16. The DM component of a current is illustrated in FIG. 21.

In the example, the DM component $i_{dm}$ flows from third winding W3 in the second branch through the common node $N_C$ to the first winding W1 in the first branch such that the DM component $i_{dm}$ is circulating in the first phase circuit 22. As such, the DM component $i_{dm}$, if not suppressed, will cause an energy waste in the circulation without converting into useful energy, and needs to be suppressed, as shown in FIG. 22.

Figure 22:
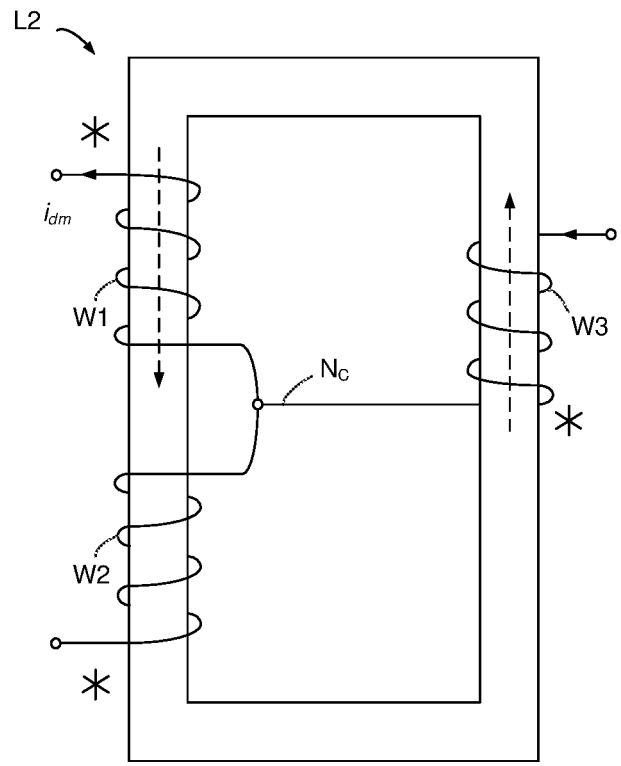
FIG. 22 illustrates an example of windings around the magnetic core with flux corresponding to the common mode component of current of FIG. 21 in accordance with some example embodiments of the present disclosure.

FIG. 22 illustrates an example of windings around the magnetic core with flux corresponding to the common mode component of current of FIG. 21 in accordance with some example embodiments of the present disclosure. By the configuration of FIG. 9, the DM component of a current can be suppressed.

Dotted terminals of the first, second and third windings W1, W2 and W3 are the same as those of FIG. 18. Thus, the description of the dotted terminals is omitted here for brevity. FIG. 22 also shows a first flux generated by the DM component $i_{dm}$ in the first branch and a second flux generated by the DM component $i_{dm}$ in the second branch.

The first flux and the second flux are generated to be in the different directions. As such, the first flux and the second flux will enhance with each other, such that inductance of the first and fourth windings W1 and W3 would be increased. Due to the increasing of the inductance of the windings, the DM component of the circulating current is suppressed by the increased inductance. Thus, the useless DM component can be suppressed at a lower level, and more energy can be converted into useful energy.

Figure 23:
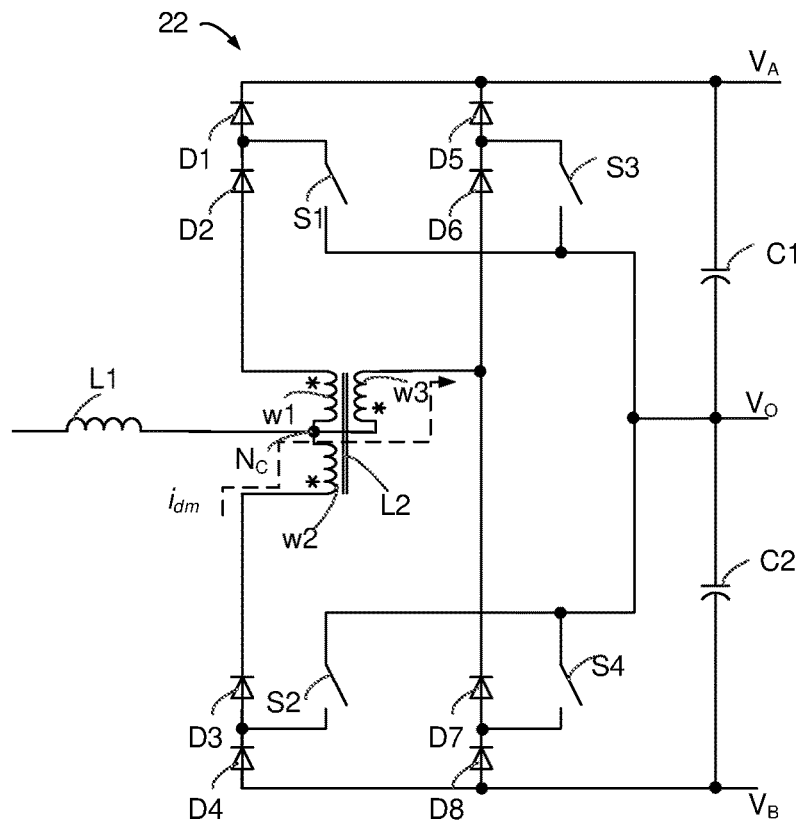
FIG. 23 illustrates another example of differential mode component of current in the phase circuit of FIG. 16 in accordance with some example embodiments of the present disclosure.

FIG. 23 illustrates another example of DM component of a current in the phase circuit 22 of FIG. 16 in accordance with some example embodiments of the present disclosure. The electrical configuration of FIG. 23 is the same as that of FIG. 16. The DM component of a current is illustrated in FIG. 23.

In the example, the DM component $i_{dm}$ flows from second winding W2 in the first branch through the common node $N_C$ to the third winding W3 in the second branch such that the DM component $i_{dm}$ is circulating in the first phase circuit 22. As such, the DM component $i_{dm}$, if not suppressed, will cause an energy waste in the circulation without converting into useful energy, and needs to be suppressed, as shown in FIG. 24.

Figure 24:
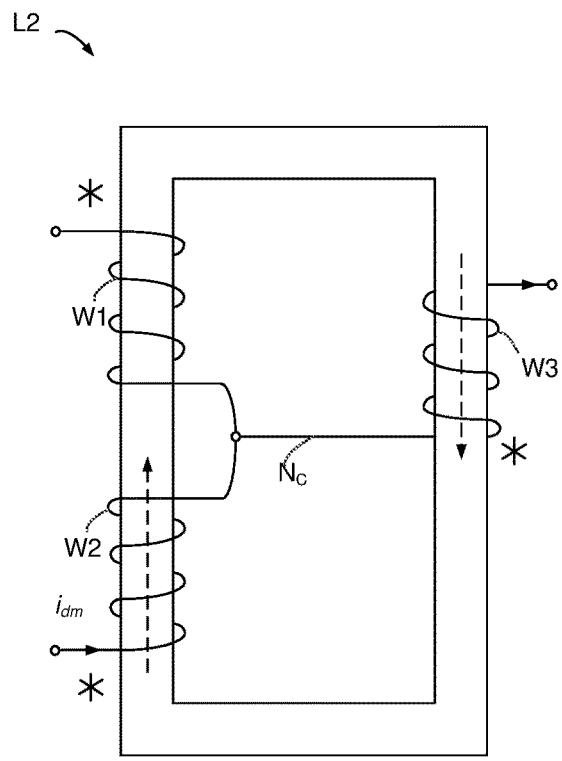
FIG. 24 illustrates an example of windings around the magnetic core with flux corresponding to the common mode component of current of FIG. 23 in accordance with some example embodiments of the present disclosure.

FIG. 24 illustrates an example of windings around the magnetic core with flux corresponding to the common mode component of current of FIG. 23 in accordance with some example embodiments of the present disclosure. By the configuration of FIG. 24, the DM component of a current can be suppressed.

Dotted terminals of the first, second, and third windings W1, W2 and W3 are the same as those of FIG. 18. Thus, the description of the dotted terminals is omitted here for brevity. FIG. 24 also shows a first flux generated by the DM component $i_{dm}$ in the first branch and a second flux generated by the DM component $i_{dm}$ in the second branch.

The first flux and the second flux are generated to be in the different directions. As such, the first flux and the second flux will enhance with each other, such that inductance of the first and third windings W1 and W3 would be increased. Due to the increasing of the inductance of the windings, the DM component of the circulating current is suppressed by the increased inductance. Thus, the useless DM component can be suppressed at a lower level, and more energy can be converted into useful energy.

By the configuration as illustrated in FIGS. 16-23, harmonics from the interleaved legs can be cancelled causing a better harmonic performance and helping to reduce a size of the AC boost inductor. Also, the circulating current is effectively suppressed by the configuration of windings around the core L2 leading to a lower current ripple and high efficiency. To sum up, the configuration of the embodiments of the present disclosure may achieve a high efficiency and reduce cost, as stated above.

Although FIGS. 16-24 illustrate a specific configuration of a phase circuit and its principle for CM and DM components, this is only for illustration without suggesting any limitations as to the scope of the subject matter described here. For example, other configurations are possible, as described below.

Figure 25:
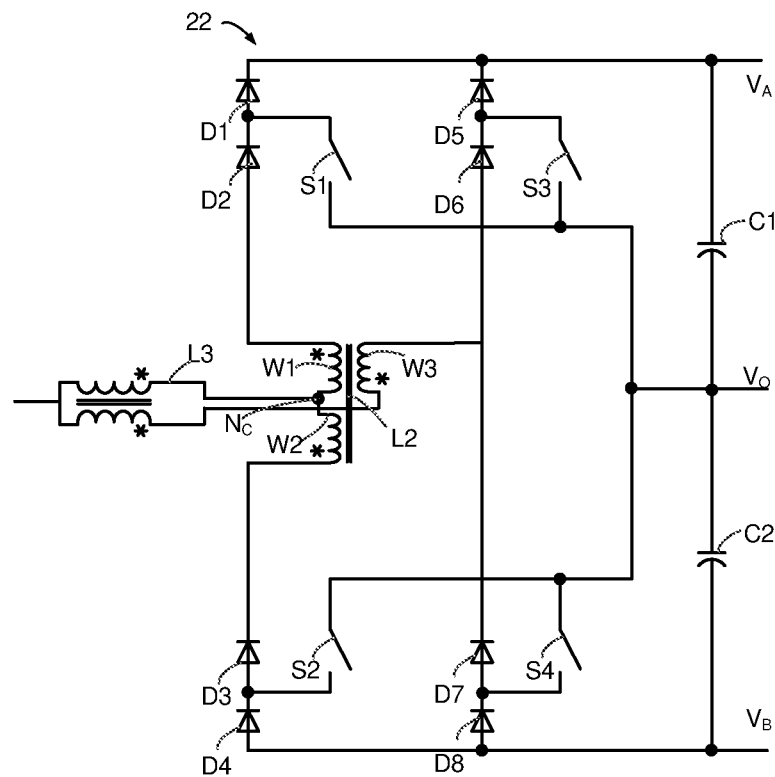
FIG. 25 illustrates another example of a phase circuit of the converter of FIG. 15 in accordance with some example embodiments of the present disclosure.

FIG. 25 illustrates another example of a phase circuit 22 of the converter of FIG. 15 in accordance with some example embodiments of the present disclosure. The phase circuit 22 of FIG. 25 is similar to the phase circuit of FIG. 16 except for the CM inductor L3. The CM inductor L3 includes a first winding connecting to the common node $N_C$ between the first and second windings W1 and W2 in the first branch, and a second winding connecting to the intermediate node between the third winding W3 in the second branch.

The configuration of FIG. 25 operates in a similar manner as that of FIG. 16. In other words, operation for Table 2 can be also applied to the configuration of FIG. 25. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 26:
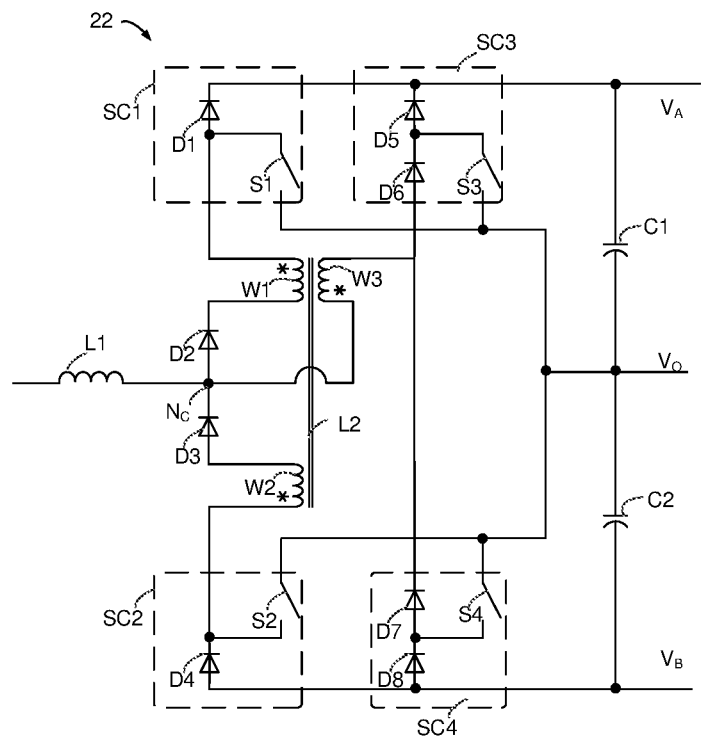
FIG. 26 illustrates a further example of a phase circuit of the converter of FIG. 15 in accordance with some example embodiments of the present disclosure.

FIG. 26 illustrates a further example of a phase circuit 22 of the converter of FIG. 15 in accordance with some example embodiments of the present disclosure. The phase circuit 22 of FIG. 26 is similar to the phase circuit of FIG. 16 except for positions of the second and third diodes D2 and D3. The second diode D2 is located between the common node $N_C$ and the first winding W1, the third diode D3 is located between the common node $N_C$ and the second winding W3.

The configuration of FIG. 26 operates in a similar manner as that of FIG. 16. In other words, operation for Table 2 can be also applied to the configuration of FIG. 26. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 27:
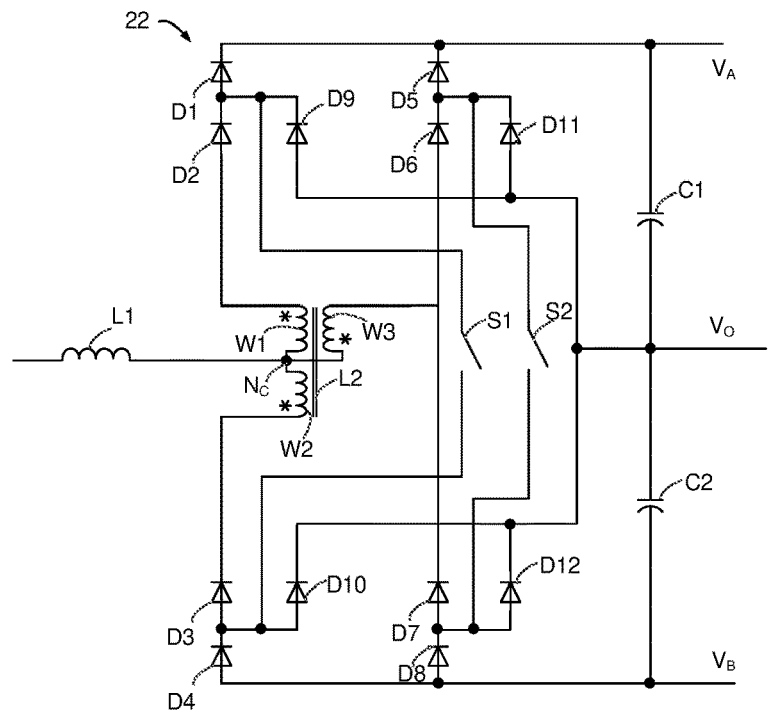
FIG. 27 illustrates a further example of a phase circuit of the converter of FIG. 15 in accordance with some example embodiments of the present disclosure.

FIG. 27 illustrates a further example of a phase circuit 22 of the converter of FIG. 15 in accordance with some example embodiments of the present disclosure. The phase circuit 22 of FIG. 27 is similar to the phase circuit of FIG. 3 except for switching elements. As an alternative for the first switch S1 in FIG. 16, a ninth diode D9 is provided between the intermediate node between the first and second diodes D1 and D2 and the neutral node $V_O$ in FIG. 27, and a switch S1 is provided between the intermediate node between the first and second diodes D1 and D2 and the intermediate node between the third and fourth diodes D3 and D4. The second, third and fourth switch S2, S3 and S4 in FIG. 16 can be alternatively replaced by the tenth, eleventh, twelfth diodes D10, D11, and D12 and the first and second switches S1 and S2 in FIG. 27.

The configuration of FIG. 27 operates in a similar manner as that of FIG. 16. As such, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 28:
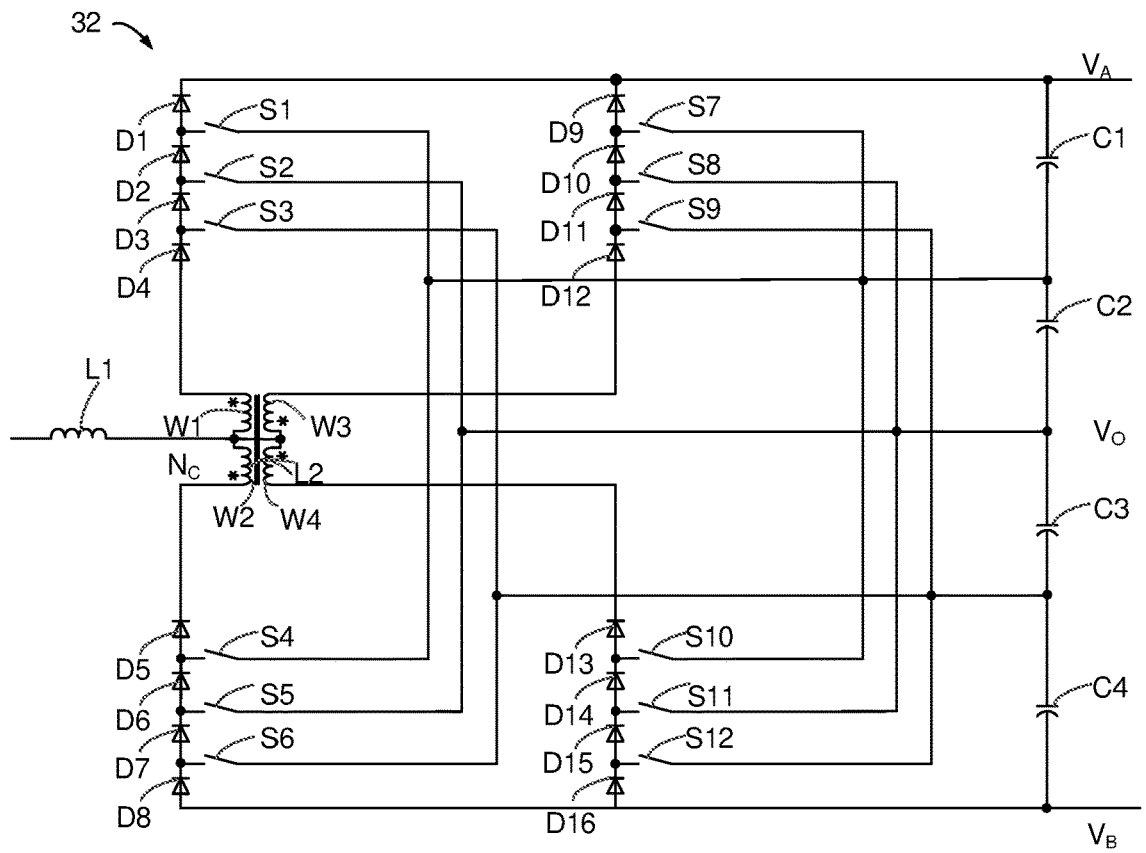
FIG. 28 illustrates another example of a phase circuit of an AC-DC converter in accordance with some example embodiments of the present disclosure.

FIG. 28 illustrates another example of a phase circuit 32 of an AC-DC converter in accordance with some example embodiments of the present disclosure. The phase circuit 32 is a nine level phase circuit, and may be an alternation for the phase circuits 12 and 22.

Assuming that the DC-link voltage across the first and second DC terminals $V_A$ and $V_B$ is $V_{AB}$, the voltage across each of the capacitors C1, C2, C3 and C4 is $V_{AB}/4$. Assuming that the potential of the neutral node $V_O$ is '0'. In this event, the phase voltage $V_P$, namely the voltage between the common node $N_C$ and the neutral node $N_O$, has nine voltage levels in this topology. In modulation, the two branches will be controlled in interleaved way, and the nine voltage levels will reveal themselves automatically. The phase voltage $V_P$ may present voltages of $V_{AB}$, $V_{AB}*3/4$, $V_{AB}/2$, $V_{AB}/4$, 0, $-V_{AB}/4$, $-V_{AB}/2$, $-V_{AB}*3/4$ and $-V_{AB}$ during operation.

Figure 29:
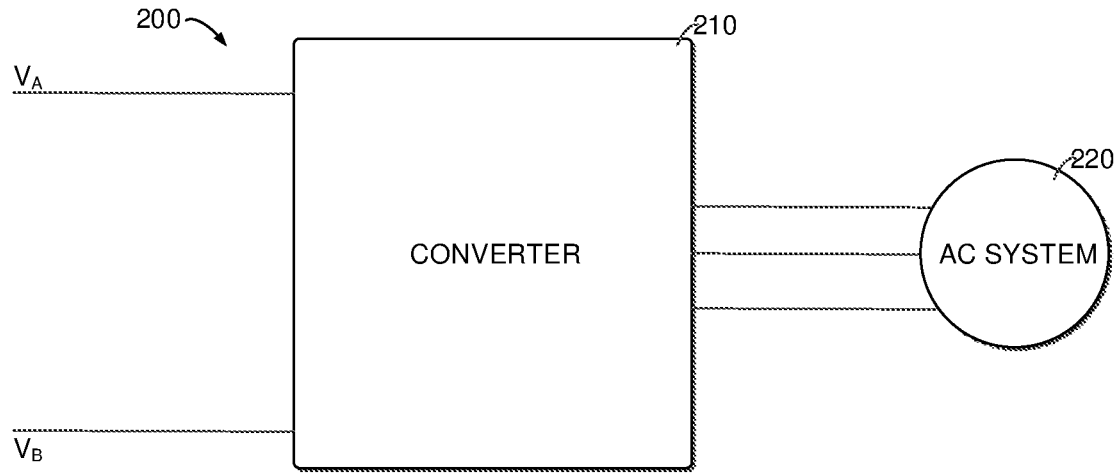
FIG. 29 illustrates a DC-AC electric system in accordance with some example embodiments of the present disclosure.

FIG. 29 illustrates a DC-AC electric system 200 in accordance with some example embodiments of the present disclosure. As described above, the embodiments of the present application may be applied to DC-AC electric system. The electric system 200 includes an AC system 220, and a converter 210 for converting a DC current into an AC current. The converter 210 may include three phase circuits for three phases of the AC system 220.

Figure 30:
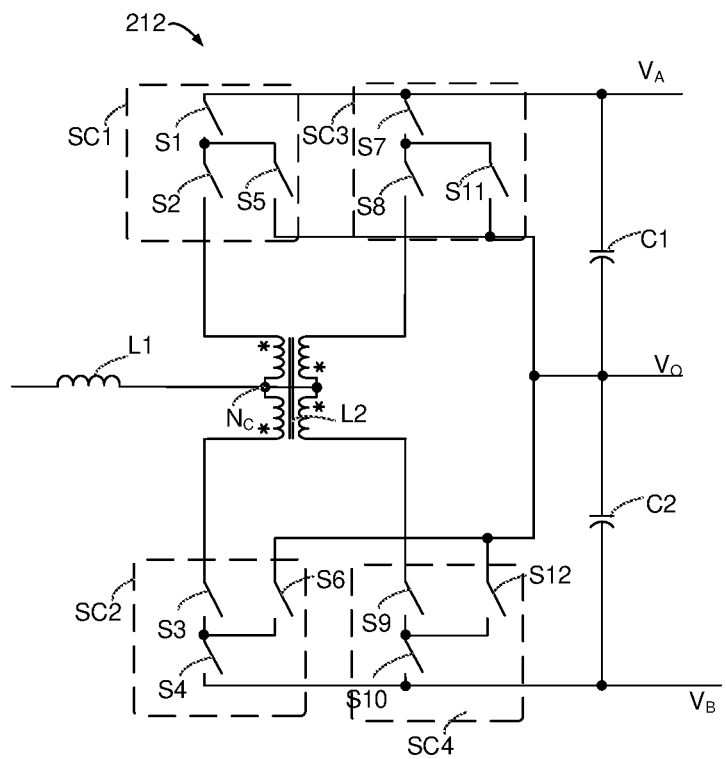
FIG. 30 illustrates an example of a phase circuit of a DC-AC converter in accordance with some example embodiments of the present disclosure.

FIG. 30 illustrates an example of a phase circuit 212 of a DC-AC converter 210 in accordance with some example embodiments of the present disclosure. The converter 210 is a five-level converter, and is configured to convert a DC voltage between the DC terminals $V_A$ and $V_B$ into an AC voltage.

The voltage between the common node $N_C$ and the neutral node $N_O$ may present a voltage at five potential levels, as described above with reference to the embodiments of the AC-DC converter 10. Although a five-level converter 210 is illustrated, this is only for illustration without suggesting any limitations as to the scope of the subject matter described here. For example, three-level or more-level, such as seven-level or nine-level, may be included in the scope of the subject matter described here.

The phase circuits in the DC-AC converter 210 may have the same or similar topologies, and thus only one phase circuit will be described for brevity. The converter 210 includes a controlling center (not shown) to control operations of switches in switching circuit in the first, second and third phase circuits. The couplings of the controlling center to the switches in the converter 210 are not illustrated to avoid blurring the figure. Although the couplings are not illustrated, it is understood that the controlling center couples to the switches in the converter 10 directly or indirectly.

The first phase circuit 212 includes first branch and a second branch. The first branch is coupled between a first DC terminal $V_A$ and a second DC terminal $V_B$ and including a first winding W1 and a second winding W2 around a magnetic core L2. The first winding and the second winding W1 and W2 are coupled to the AC terminal via a common node $N_C$.

The second branch is coupled in parallel to the first branch between the first and second DC terminals $V_A$ and $V_B$ and includes a third winding W3 and a fourth winding W4 around the magnetic core L2. The third winding W3 and the fourth winding W4 are coupled to the AC terminal via the common node $N_C$ such that the first and second branches are configured to convert a first voltage into a second voltage. The first, second, third and fourth windings W1, W2, W3 and W4 are configured to cause magnetic flux generated by DM component of a first current in the first branch and magnetic flux generated by DM component of a second current in the second branch to enhance with each other.

The first branch also includes a first switching circuit SC1 coupled between the first winding W1 and the first DC terminal $V_A$ and a second switching circuit SC2 between the second winding W2 and the second DC terminal $V_B$. The second branch also includes a third switching circuit SC3 coupled between the third winding W3 and the first DC terminal $V_A$ and a fourth switching circuit SC4 between the fourth winding W4 and the second DC terminal $V_B$.

The first switching circuit SC1 includes a first diode D1 and a second diode D2 coupled in series and a first switch S1 coupled to an intermediate node between the first and second diodes and the neutral node $N_O$. The second, third and fourth switching circuits SC2, SC3 and SC4 are substantially the same as the first switching circuit SC1. Thus, the description for the second, third and fourth switching circuits SC2, SC3 and SC4 are omitted here for brevity.

To sum up, a serial connection of the first winding W1 and the first switching circuit SC1 is coupled with the first DC terminal $V_A$ and the common node $N_C$. A serial connection of the third winding W3 and the third switching circuit SC3 is coupled in parallel to the serial connection of the first winding W1 and the first switching circuit S1.

A serial connection of the second winding W2 and the second switching circuit SC2 is coupled with the second DC terminal $V_B$ and the common node $N_C$. In FIG. 30, the second branch further includes a serial connection of a fourth winding W4 and a fourth switching circuit SC4. The serial connection of the fourth winding W4 and the fourth switching circuit SC4 are coupled in parallel to the serial connection of the second winding and the second switching circuit.

Assuming that the DC-link voltage across the first and second DC terminals $V_A$ and $V_B$ is $V_{AB}$, the voltage across each of the capacitors C1 and C2 is $V_{AB}/2$. Assuming that the potential of the neutral node $V_O$ is '0'. In this event, the phase voltage $V_P$, namely the voltage between the common node $N_C$ and the neutral node $N_O$, has five voltage levels in this topology.

The five voltage levels, corresponding to the phase voltages and device switching states are shown in Table 1. The five voltage levels are represented by '2', '1', '0', '−1' and '−2'. Their corresponding five phase voltages are '$V_{AB}/2$', '$V_{AB}/4$', '0', '−$V_{AB}/4$' and '−$V_{AB}/2$'. In modulation, the two branches will be controlled in interleaved way, and the five voltage levels will reveal themselves automatically. In table 1, the state of turning-on is represented by '1', and the state of turning-off is represented by '0'. For example, the symbol '1' for the first switch S1 or the first diode D1 represents that the first switch S1 or the first diode D1 is turned on, and the symbol '0' for the first switch S1 or the first diode D1 represents that the first switch S1 or the first diode D1 is turned off.

TABLE 3

Voltage level and device switching state of the converter

| Voltage Level | Phase Voltage, ($V_p$) | S1 | S2 | S3 | S4 | S5 | S6 | S7 | S8 | S9 | S10 | S11 | S12 |
|---|---|---|---|---|---|---|---|---|---|---|---|---|---|
| 2 | $V_{AB}/2$ | 1 | 1 | 0 | 0 | 0 | 0 | 1 | 1 | 0 | 0 | 0 | 0 |
| 1 | $V_{AB}/4$ | 1 | 1 | 0 | 0 | 0 | 0 | 0 | 1 | 0 | 0 | 1 | 0 |
|   |   | 1 | 1 | 0 | 0 | 0 | 0 | 0 | 0 | 1 | 0 | 0 | 1 |
|   |   | 0 | 1 | 0 | 0 | 1 | 0 | 1 | 1 | 0 | 0 | 0 | 0 |
| 0 | 0 | 0 | 0 | 1 | 0 | 0 | 1 | 1 | 1 | 0 | 0 | 0 | 0 |
|   |   | 0 | 1 | 0 | 0 | 1 | 0 | 0 | 1 | 0 | 0 | 1 | 0 |
|   |   | 0 | 1 | 0 | 0 | 1 | 0 | 0 | 0 | 1 | 0 | 0 | 1 |
|   |   | 0 | 0 | 1 | 0 | 0 | 1 | 0 | 1 | 0 | 0 | 1 | 0 |
|   |   | 0 | 0 | 1 | 0 | 0 | 1 | 0 | 0 | 1 | 0 | 0 | 1 |
|   |   | 1 | 1 | 0 | 0 | 0 | 0 | 0 | 0 | 1 | 1 | 0 | 0 |
|   |   | 0 | 0 | 1 | 1 | 0 | 0 | 1 | 1 | 0 | 0 | 0 | 0 |
| −1 | −$V_{AB}/4$ | 0 | 0 | 1 | 1 | 0 | 0 | 0 | 1 | 0 | 0 | 1 | 0 |
|   |   | 0 | 0 | 1 | 1 | 0 | 0 | 0 | 0 | 1 | 0 | 0 | 1 |
|   |   | 0 | 1 | 0 | 0 | 1 | 0 | 0 | 0 | 1 | 1 | 0 | 0 |
|   |   | 0 | 0 | 1 | 0 | 0 | 1 | 0 | 0 | 1 | 1 | 0 | 0 |
| −2 | −$V_{AB}/2$ | 0 | 0 | 1 | 1 | 0 | 0 | 0 | 0 | 1 | 1 | 0 | 0 |

It is to be understood that the switching operation for the switches are controlled by the controlling center 18, and the states of the diodes are based on current direction.

Similar to the configuration of FIG. 5, dotted terminals of the first and second windings W1 and W2 are terminals away from the common node ($N_C$), and dotted terminals of the third and fourth windings are terminals coupled to the common node ($N_C$. In an example, the first flux generated by the CM component in the first branch and the second flux generated by the CM component in the second branch may be in the same direction, for example, in a direction from the first winding to the second winding, for the CM component. As such, the first flux and the second flux cancel with each other, such that inductance of the first and second windings W1 and W2 would be decreased. This would facilitate voltage conversion.

In an example, the first flux generated by the DM component in the first branch and the second flux generated by the DM component in the second branch may be in different directions for the DM component. As such, the first flux and the second flux enhance with each other, such that inductance of the first and second windings W1 and W2 would be increased.

As described above, the DM component of a current can be suppressed since the magnetic flux generated by the first branch and the magnetic flux generated by the second branch enhance with each other and the inductance will increase accordingly, and the CM component of the current is substantially not affected since the magnetic flux generated by the first branch and the magnetic flux generated by the second branch cancel with each other and the inductance will decrease accordingly.

Figure 31:
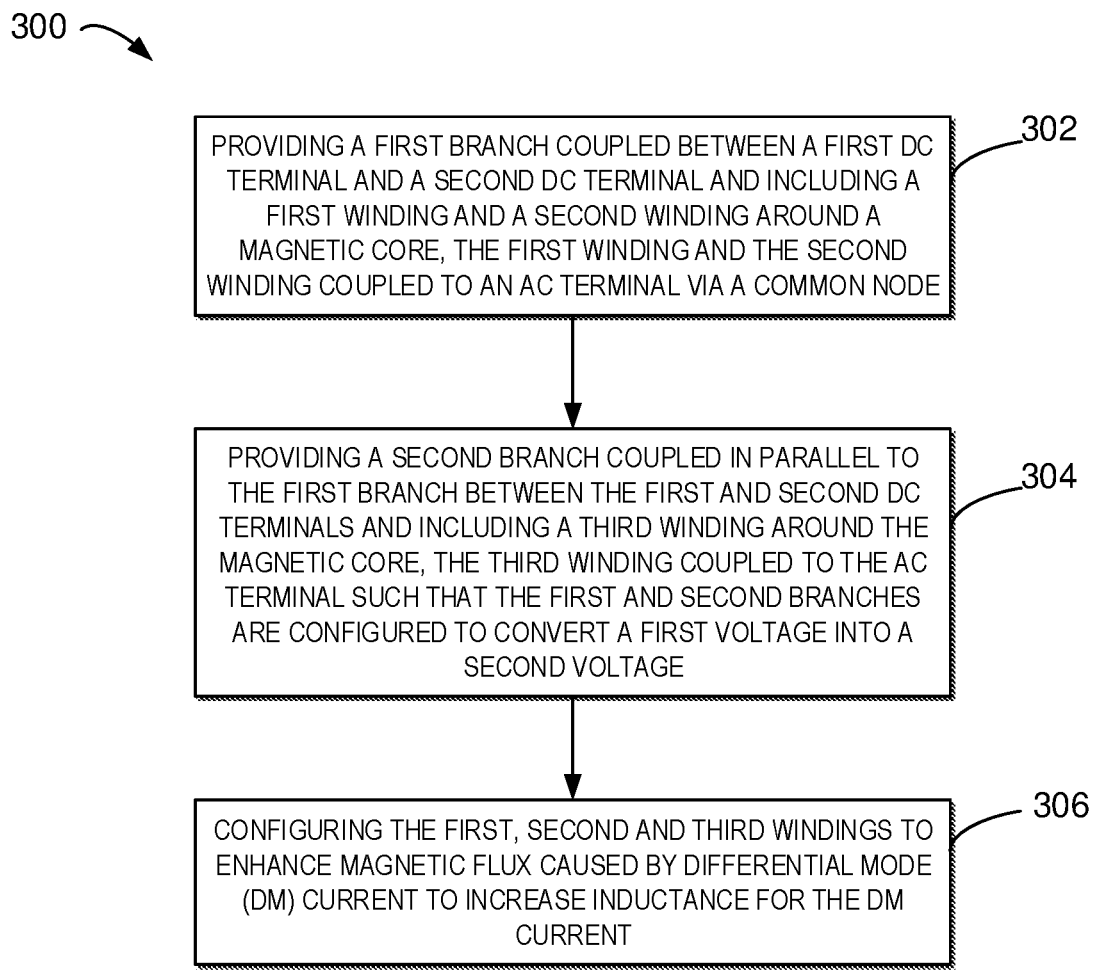
FIG. 31 illustrates an example of a method for manufacturing a converter in accordance with some example embodiments of the present disclosure.

FIG. 31 illustrates an example of a method for manufacturing a converter in accordance with some example embodiments of the present disclosure. The method may be applied to manufacture the converters 10, 20 and 210.

At 302, it is provided a first branch coupled between a first DC terminal and a second DC terminal and including a first winding and a second winding around a magnetic core, the first winding and the second winding coupled to an alternating current terminal via a common node.

At 304, it is provided a second branch coupled in parallel to the first branch between the first and second DC terminals and including a third winding around the magnetic core. The third winding is coupled to the AC terminal such that the first and second branches are configured to convert a first voltage into a second voltage.

At 306, the first, second and third windings are configured to cause magnetic flux generated by DM component of a first current in the first branch and magnetic flux generated by DM component of a second current in the second branch to enhance with each other.

Although the method 300 is illustrated in FIG. 31, this is only for illustration without suggesting any limitations as to the scope of the subject matter described here. For example, it is to be understood that all the features for the FIGS. 2-30 can be applied to the method 300.

Hereinafter, some example implementations of the subject matter described herein will be listed.

Item 1: There is provided voltage converter circuit comprising a first branch and a second branch. The first branch is coupled between a first DC terminal and a second DC terminal and includes a first winding and a second winding around a magnetic core. The first winding and the second winding are coupled to an AC terminal via a common node. The second branch is coupled in parallel to the first branch between the first and second DC terminals and includes a third winding around the magnetic core. The third winding is coupled to the AC terminal such that the first and second branches are configured to convert a first voltage into a second voltage. The first, second and third windings are configured to cause magnetic flux generated by differential mode (DM) component of a first current in the first branch and magnetic flux generated by DM component of a second current in the second branch to enhance with each other.

Item 2: The voltage converter circuit of Item 1, wherein the first, second and third windings are configured to reduce magnetic flux caused by CM current to reduce inductance for the CM current.

Item 3: The voltage converter circuit of Item 1 or 2, wherein dotted terminals of the first and second windings are terminals away from the common node, and a dotted terminal of the third winding is a terminal coupled to the common node.

Item 4: The voltage converter circuit of any of Items 1-3, wherein the first branch includes a first switching circuit coupled between the first DC terminal and the first winding and a second switching circuit coupled between the second DC terminal and the second winding. The second branch includes a third switching circuit coupled between the first DC terminal and the third winding. The first and second branches are configured to operate to provide a converted voltage at different potential levels.

Item 5: The voltage converter circuit of any of Items 1-4, wherein the second branch further comprises a fourth winding around the magnetic core and coupled to the common node and a fourth switching circuit configured to be coupled between the second DC terminal and the fourth winding.

Item 6: The voltage converter circuit of any of Items 1-5, wherein the first switching circuit includes a first diode and a second diode coupled in series, and a first switch coupled to a neutral node between the first and second DC terminals and a first intermediate node between the first diode and the second diode. The second switching circuit includes a third diode and a fourth diode coupled in series, and a second switch (S2) coupled to the neutral node and a second intermediate node between the third diode and the fourth diode.

Item 7: The voltage converter circuit of any of Items 1-6, wherein the third switching circuit includes a fifth diode and a sixth diode coupled in series, and a third switch coupled to the neutral node and an intermediate node between the fifth diode and the sixth diode. The fourth switching circuit includes a seventh diode and a eighth diode coupled in series, and a fourth switch (S4) coupled to the neutral node and an intermediate node between the seventh diode and the eighth diode.

Item 8: The voltage converter circuit of any of Items 1-7, wherein the first, second, third and fourth switches are turned off to cause a voltage between the common node and the neutral node to be at a first level, a third level or a fifth level based on an input voltage at the AC terminal.

Item 9: The voltage converter circuit of any of Items 1-8, wherein one of the first, second, third and fourth switches are turned on to cause a voltage between the common node and the neutral node to be at a second level or a fourth level based on the input voltage at the AC terminal.

Item 10: The voltage converter circuit of any of Items 1-9, wherein one of the first and second switches, and one of the third and fourth switches are turned on to cause a voltage between the common node and the neutral node to be at the third level.

Item 11: The voltage converter circuit of any of Items 1-10, wherein a serial connection of the first winding and the first switching circuit is coupled with the first DC terminal and the common node. A serial connection of the third winding and the third switching circuit is coupled in parallel to the serial connection of the first winding and the first switching circuit. A serial connection of the second winding and the second switching circuit is coupled with the second DC terminal and the common node.

Item 12: The voltage converter circuit of any of Items 1-11, wherein the second branch further includes a fourth switching circuit coupled with the third winding and the second DC terminal.

Item 13: The voltage converter circuit of any of Items 1-12, wherein the second branch further includes a serial connection of a fourth winding and a fourth switching circuit. The serial connection of the fourth winding and the fourth switching circuit are coupled in parallel to the serial connection of the second winding and the second switching circuit.

Item 14: The voltage converter circuit of any of Items 1-13, wherein the first and second windings are coupled to the AC terminal via a first winding of a CM inductor. The third winding is coupled to the AC terminal via a second winding of the CM inductor.

Item 15: The voltage converter circuit of any of Items 1-14, wherein the voltage converter circuit includes an AC-DC converter configured to convert the first voltage into the second voltage including a plurality of potential levels. The voltage converter circuit further includes a controlling center configured to control operation of switches of the voltage converter circuit.

Item 16: The voltage converter circuit of any of Items 1-15, wherein the AC-DC converter comprises a first capacitor coupled to the first DC terminal and a neutral node and a second capacitor is coupled to the second DC terminal and the neutral node.

Item 17: The voltage converter circuit of any of Items 1-16, wherein the first switching circuit includes a first diode and a second diode coupled in series, and a ninth diode coupled to a neutral node between the first and second DC terminals and a first intermediate node between the first diode and the second diode. The second switching circuit includes a third diode and a fourth diode coupled in series, and a tenth diode coupled to the neutral node and a second intermediate node between the third diode and the fourth diode. The first branch further comprises a first switch coupled between the first and second intermediate nodes.

Item 18: The voltage converter circuit of any of Items 1-17, wherein the third switching circuit includes a fifth diode and a sixth diode coupled in series, and an eleventh diode coupled to a neutral node between the first and second DC terminals and a third intermediate node between the fifth diode and the sixth diode. The second switching circuit includes a seventh diode and a eighth diode coupled in series, and a twelfth diode coupled to the neutral node and a fourth intermediate node between the seventh diode and the eighth diode. The second branch further comprises a second switch coupled between the third and fourth intermediate nodes.

Item 19: There is provided an electrical system comprising: a voltage converter circuit of any of Items 1-18 and a controlling center. The controlling center is configured to receive a request for voltage conversion; and control the voltage converter circuit to provide a converted voltage based on the request.

Item 20: There is provided a method for manufacturing a voltage converter circuit. The method comprises providing a first branch coupled between a DC terminal and a second DC terminal and including a first winding and a second winding around a magnetic core. The first winding and the second winding are coupled to an alternating current terminal via a common node. The method further comprises providing a second branch coupled in parallel to the first branch between the first and second DC terminals and including a third winding around the magnetic core. The third winding is coupled to the AC terminal such that the first and second branches are configured to convert a first voltage into a second voltage. The method further comprises configuring the first, second and third windings to cause magnetic flux generated by DM component of a first current in the first branch and magnetic flux generated by DM component of a second current in the second branch to enhance with each other.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A voltage converter circuit, comprising:
 a first branch coupled between a first direct current (DC) terminal and a second DC terminal and including a first winding and a second winding around a magnetic core, the first winding and the second winding coupled to an alternating current (AC) terminal via a common node; and
 a second branch coupled in parallel to the first branch between the first and second DC terminals and including a third winding around the magnetic core, the third winding coupled to the AC terminal such that the first and second branches are configured to convert a first voltage into a second voltage;
 wherein the first, second and third windings are configured to cause magnetic flux generated by a differential mode (DM) component of a first current in the first branch and magnetic flux generated by the DM component of a second current in the second branch to enhance with each other.

2. The voltage converter circuit of claim 1, wherein the first, second and third windings are configured to reduce magnetic flux caused by a common mode (CM) current to reduce inductance for the CM current.

3. The voltage converter circuit of claim 1, wherein dotted terminals of the first and second windings are terminals away from the common node, and a dotted terminal of the third winding is a terminal coupled to the common node.

4. The voltage converter circuit of claim 1, wherein the first branch includes a first switching circuit coupled between the first DC terminal and the first winding and a second switching circuit coupled between the second DC terminal and the second winding;
 the second branch includes a third switching circuit coupled between the first DC terminal and the third winding; and
 the first and second branches are configured to operate to provide a converted voltage at different potential levels.

5. The voltage converter circuit of claim 4, wherein the second branch further comprises a fourth winding around the magnetic core and coupled to the common node and a fourth switching circuit configured to be coupled between the second DC terminal and the fourth winding.

6. The voltage converter circuit of claim 5, wherein the first switching circuit includes a first diode and a second diode coupled in series, and a first switch coupled to a neutral node between the first and second DC terminals and a first intermediate node between the first diode and the second diode; and the second switching circuit includes a third diode and a fourth diode coupled in series, and a second switch coupled to the neutral node and a second intermediate node between the third diode and the fourth diode.

7. The voltage converter circuit of claim 6, wherein the third switching circuit includes a fifth diode and a sixth diode coupled in series, and a third switch coupled to the neutral node and an intermediate node between the fifth diode and the sixth diode; and the fourth switching circuit includes a seventh diode and a eighth diode coupled in series, and a fourth switch coupled to the neutral node and an intermediate node between the seventh diode and the eighth diode.

8. The voltage converter circuit of claim 7, wherein the first, second, third and fourth switches are turned off to cause a voltage between the common node and the neutral node to be at a first level, a third level or a fifth level based on an input voltage at the AC terminal.

9. The voltage converter circuit of claim 8, wherein one of the first, second, third and fourth switches are turned on to cause a voltage between the common node and the neutral node to be at a second level or a fourth level based on the input voltage at the AC terminal.

10. The voltage converter circuit of claim 9, wherein one of the first and second switches, and one of the third and fourth switches are turned on to cause a voltage between the common node and the neutral node to be at the third level.

11. The voltage converter circuit of claim 4, wherein a serial connection of the first winding and the first switching circuit is coupled with the first DC terminal and the common node, a serial connection of the third winding and the third switching circuit is coupled in parallel to the serial connection of the first winding and the first switching circuit; and a serial connection of the second winding and the second switching circuit is coupled with the second DC terminal and the common node.

12. The voltage converter circuit of claim 11, wherein the second branch further includes a fourth switching circuit coupled with the third winding and the second DC terminal.

13. The voltage converter circuit of claim 11, wherein the second branch further includes a serial connection of a fourth winding and a fourth switching circuit; and the serial connection of the fourth winding and the fourth switching circuit are coupled in parallel to the serial connection of the second winding and the second switching circuit.

14. The voltage converter circuit of claim 1, wherein the first and second windings are coupled to the AC terminal via a first winding of a CM inductor; and the third winding is coupled to the AC terminal via a second winding of the CM inductor.

15. The voltage converter circuit of claim 1, wherein the voltage converter circuit includes an AC-DC converter configured to convert the first voltage into the second voltage including a plurality of potential levels; and the voltage converter circuit further includes a controlling center configured to control operation of switches of the voltage converter circuit.

16. The voltage converter circuit of claim 15, wherein the AC-DC converter comprises a first capacitor coupled to the first DC terminal and a neutral node; and a second capacitor coupled to the second DC terminal and the neutral node.

17. The voltage converter circuit of claim 4, wherein the first switching circuit includes a first diode and a second diode coupled in series, and a ninth diode coupled to the neutral node between the first and second DC terminals and a first intermediate node between the first diode and the second diode;

the second switching circuit includes a third diode and a fourth diode coupled in series, and a tenth diode coupled to the neutral node and a second intermediate node between the third diode and the fourth diode; and the first branch further comprises a first switch coupled between the first and second intermediate nodes.

18. The voltage converter circuit of claim 17, wherein the third switching circuit includes a fifth diode and a sixth diode coupled in series, and an eleventh diode coupled to the neutral node between the first and second DC terminals and a third intermediate node between the fifth diode and the sixth diode;

the second switching circuit includes a seventh diode and a eighth diode coupled in series, and a twelfth diode coupled to the neutral node and a fourth intermediate node between the seventh diode and the eighth diode; and the second branch further comprises a second switch coupled between the third and fourth intermediate nodes.

19. An electrical system comprising:

a voltage converter circuit, comprising:

a first branch coupled between a first direct current (DC) terminal and a second DC terminal and including a first winding and a second winding around a magnetic core, the first winding and the second winding coupled to an alternating current (AC) terminal via a common node; and a second branch coupled in parallel to the first branch between the first and second DC terminals and including a third winding around the magnetic core, the third winding coupled to the AC terminal such that the first and second branches are configured to convert a first voltage into a second voltage;

wherein the first, second and third windings are configured to cause magnetic flux generated by a differential mode (DM) component of a first current in the first branch and magnetic flux generated by the DM component of a second current in the second branch to enhance with each other; and a controlling center configured to receive a request for voltage conversion; and control the voltage converter circuit to provide a converted voltage based on the request.

20. A method for manufacturing a voltage converter circuit, comprising:

providing a first branch coupled between a first direct current (DC) terminal and a second DC terminal and including a first winding and a second winding around a magnetic core, the first winding and the second winding coupled to an alternating current (AC) terminal via a common node;

providing a second branch coupled in parallel to the first branch between the first and second DC terminals and including a third winding around the magnetic core, the third winding coupled to the AC terminal such that the first and second branches are configured to convert a first voltage into a second voltage; and configuring the first, second and third windings to cause magnetic flux generated by a differential mode (DM) component of a first current in the first branch and magnetic flux generated by the DM component of a second current in the second branch to enhance with each other.

* * * * *